(12) United States Patent
Robertsson et al.

(10) Patent No.: US 11,280,925 B2
(45) Date of Patent: *Mar. 22, 2022

(54) SIMULTANEOUS SOURCE ACQUISITION AND SEPARATION METHOD

(71) Applicant: APPARITION GEOSERVICES GMBH, Pfäffikon (CH)

(72) Inventors: Johan Robertsson, Wald (CH); Kurt Eggenberger, Schinznach (CH); Dirk-Jan Van Manen, Otelfingen (CH); Fredrik Andersson, Pfäffikon (CH)

(73) Assignee: APPARITION GEOSERVICES GMBH, Pfäffikon (CH)

( * ) Notice: Subject to any disclaimer, the term of this patent is extended or adjusted under 35 U.S.C. 154(b) by 350 days.

This patent is subject to a terminal disclaimer.

(21) Appl. No.: 16/407,490

(22) Filed: May 9, 2019

(65) Prior Publication Data
US 2020/0025961 A1    Jan. 23, 2020

Related U.S. Application Data

(63) Continuation of application No. PCT/IB2017/056924, filed on Nov. 6, 2017.

(30) Foreign Application Priority Data

Nov. 10, 2016 (GB) .................................. 1619037

(51) Int. Cl.
*G01V 1/38* (2006.01)
*G01V 1/135* (2006.01)
*G01V 1/36* (2006.01)

(52) U.S. Cl.
CPC ............. *G01V 1/3808* (2013.01); *G01V 1/135* (2013.01); *G01V 1/362* (2013.01); *G01V 2210/53* (2013.01)

(58) Field of Classification Search
CPC ...... G01V 1/3808; G01V 1/135; G01V 1/362; G01V 2210/53
See application file for complete search history.

(56) References Cited

U.S. PATENT DOCUMENTS 9,188,693 B2 * 11/2015 Monk .................. G01V 1/3861
10,690,793 B2 * 6/2020 Van Manen ........... G01V 1/005
(Continued)

FOREIGN PATENT DOCUMENTS

GB       2547940 A    9/2017
GB       2550181 A    11/2017
(Continued)

OTHER PUBLICATIONS

Abma, R., et al., "Independent simultaneous source acquisition and processing", Geophysics, vol. 80 No. 6, Nov.-Dec. 2015; pp. WD37-WD44.
(Continued)

*Primary Examiner* — Elias Desta
(74) *Attorney, Agent, or Firm* — Oblon, McClelland, Maier & Neustadt, L.L.P.

(57) ABSTRACT

A method for separating the unknown contributions of two or more sources from a commonly acquired set of wavefield signals representing a wavefield where the contributions from different sources are both encoded by means of the principles of signal apparition and as well as by means of different source encoding techniques.

18 Claims, 9 Drawing Sheets

Step 1: Acquire seismic recordings using at least two different simultaneous source acquisition methods with at least one of said methods being based on signal apparition.

Step 2 (recursive): Separate the wavefields encoded relative to each other using one of the at least two methods and repeat this step on each of the results using a different of the at least two methods while using each of the at least two methods only once and until each of the methods has been used only once.

Step 3: Generating a sub-surface representation of structures or Earth media properties from one or more of the mutually separated wavefields Step 4: outputting the generated sub-surface representation

(56) References Cited

U.S. PATENT DOCUMENTS

| | | |
|---|---|---|
| 2013/0135965 A1 | 5/2013 | Ji et al. |
| 2014/0278119 A1 | 9/2014 | Halliday et al. |
| 2015/0234066 A1 | 8/2015 | Poole et al. |
| 2015/0260867 A1 | 9/2015 | Abma et al. |

FOREIGN PATENT DOCUMENTS

| | | |
|---|---|---|
| GB | 2553257 A | 3/2018 |
| WO | WO 2017/149418 A1 | 9/2017 |

OTHER PUBLICATIONS

Akerberg, P., et al., "Simultaneous source separation by sparse Radon transform", 78th Annual International Meeting, SEG Las Vegas 2008 Annual Meeting, Expanded Abstracts, XP007908688, pp. 2801-2805.

Barnes, A.E., "Another look at NMO stretch", Geophysics, 1992, vol. 57 No. 5, pp. 749-751.

Beasly, C.J., et al., "A new look at simultaneous sources", 68th Annual International Meeting, SEG, Expanded Abstracts, 1998, pp. 133-136.

Bracewell, R., "The Fourier Transform & Its Applications", McGraw-Hill Science, 1999, pp. 111-115, 268-269.

Ikelle, L.T., "Decoding Methods for underdetermined Mixtures", Coding and Decoding: Seismic Data: The Concept of Multishooting, Elsevier, 2010, vol. 39, pp. 293-324, 337, and 341.

Kumar, R., et al., "Source separation for simultaneous towed-streamer marine acquisition—A compressed sensing approach", Geophysics, vol. 80 No.6, Nov.-Dec. 2015, pp. WD73-WD88.

Lynn, W., et al., "Experimental investigation of interference from other seismic crews", Geophysics, vol. 52 No. 11, Nov. 1987, pp. 1501-1524.

Moldoveanu, N., et al., "Full-azimuth imaging using circular geometry acquisition", The Leading Edge, vol. 27 No. 7, Jul. 2008, pp. 908-913.

Meuller, M.B., et al., "The benefit of encoded source sequences for simultaneous source separation", Geophysics, vol. 80 No. 5, Sep.-Oct. 2015, pp. V133-V143.

Robertsson, J. O. A., et al., "Full-wavefield, Towed-marine Seismic Acquisition and Applications", 74th EAGE Conference and Exhibition, EAGE, Jun. 2012, 5 pages.

Robertsson, J. O. A., et al., "Tools and Techniques: Marine Seismic Methods", in Resources in the near-surface Earth Treatise on Geophysics, 2nd edition (ed. G. Schubert), 2015, Elsevier-Pergamon, Oxford, pp. 175-208.

Robertsson, J. O. A., et al., "Signal apparition for simultaneous source wavefield separation", Geophys. J. Int., Express Letter, 2016, vol. 206 No. 2 , pp. 1301-1305.

Shipilova, E., et al., "Simultaneous-source seismic acquisitions: do they allow reservoir characterization? A feasibility study with blended onshore real data", 2016, 86th Annual International Meeting, SEG, Expanded Abstracts, 6 pages.

Stefani, J., et al., "Acquisition Using Simultaneous Sources", 69th Annual International Conference and Exhibition, EAGE, Extended Abstracts B006, Jun. 2007, 5 pages.

Stockwell, R.G., et al., "Localization of the Complex Spectrum: the S Transform", Signal Processing, IEEE Transactions on Signal Processing, Apr. 1996, vol. 44 No. 4, pp. 998-1001.

Ziolkowski, A., "The determination of the far-field signature of an interacting array of marine seismic sources from nearfield measurements-results from the Delft Air Gun Experiment", First Break, Jan. 1987, vol. 5 No. 1, pages.

Van Manen, D.-J., et al., "Aperiodic wavefield signal apparition: De-aliased simultaneous source separation", SEG International Exposition and 86th Annual Meeting, SEG Technical Program Expanded Abstracts, Oct. 21, 2016 SEG, XP055373672, pp. 102-106.

Robertsson, J.O.A., et al., "Wavefield signal apparition: Simultaneous source separation", Geophysical Journal International, Oct. 19, 2016, XP055373667, pp. 5648-5654.

* cited by examiner

Fig. 14

Step 1: Acquire seismic recordings using at least two different simultaneous source acquisition methods with at least one of said methods being based on signal apparition.

Step 2 (recursive): Separate the wavefields encoded relative to each other using one of the at least two methods and repeat this step on each of the results using a different of the at least two methods while using each of the at least two methods only once and until each of the methods has been used only once.

Step 3: Generating a sub-surface representation of structures or Earth media properties from one or more of the mutually separated wavefields Step 4: outputting the generated sub-surface representation

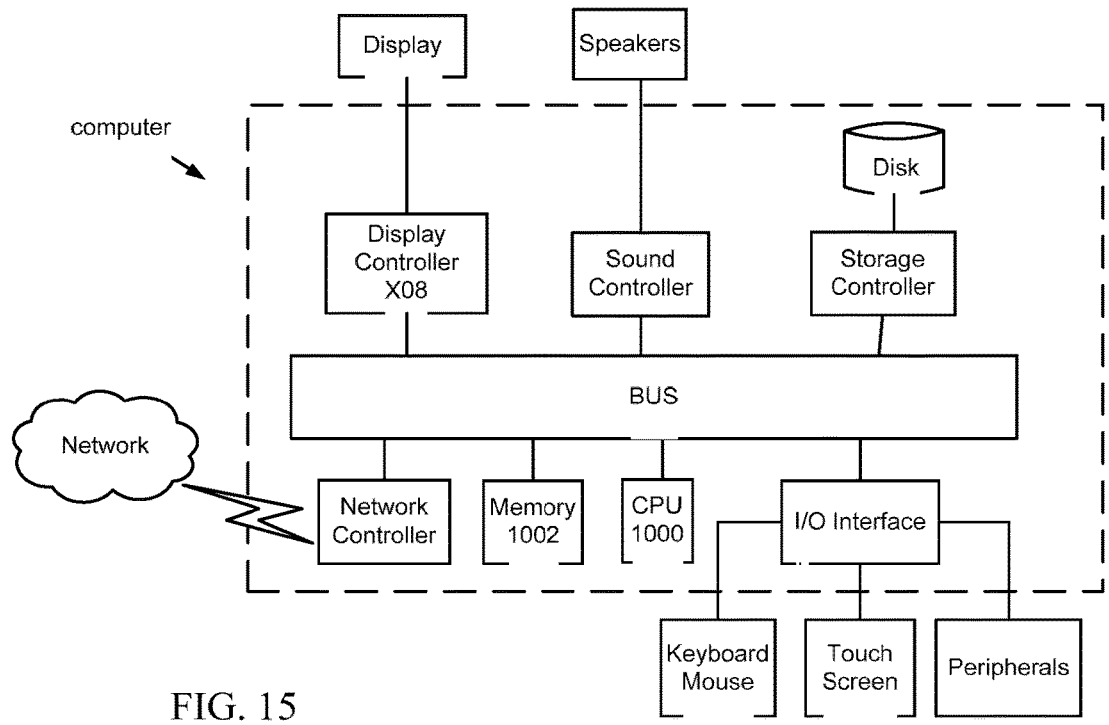

FIG. 15

SIMULTANEOUS SOURCE ACQUISITION AND SEPARATION METHOD

CROSS-REFERENCE TO RELATED APPLICATIONS

This application is a continuation of PCT Application No. PCT/IB2017/056924, filed Nov. 6, 2017, which claims priority to Great Britain Application No. 1619037.3, filed Nov. 10, 2016. The entire contents of the above-identified applications are incorporated herein by reference

FIELD

The present disclosure relates to methods for acquiring and separating contributions from two or more different simultaneously emitting sources in a common set of measured signals representing a wavefield. In particular, the present disclosure relates to acquiring and separating contributions from two or more different simultaneously emitting seismic sources where the contributions from different sources are partially encoded by means of the principles of signal apparition and partially by means of different source encoding techniques.

BACKGROUND

Seismic data can be acquired in land, marine, seabed, transition zone and boreholes for instance. Depending on in what environment the seismic survey is taken place the survey equipment and acquisition practices will vary.

The current disclosure relates to land, marine, seabed, transition zone and borehole seismic surveying. The general practice of marine and seabed seismic surveying is described below in relation to FIG. 12.

Prospecting for subsurface hydrocarbon deposits (1201) in a marine environment (FIG. 12) is routinely carried out using one or more vessels (1202) towing seismic sources (1203-1205). The one or more vessels can also tow receivers or receivers (1206-1208) can be placed on the seabed (1214).

Seismic sources typically employ a number of so-called airguns (1209-1211) which operate by repeatedly filling up a chamber in the gun with a volume of air using a compressor and releasing the compressed air at suitable chosen times (and depth) into the water column (1212).

The sudden release of compressed air momentarily displaces the seawater, imparting its energy on it, setting up an impulsive pressure wave in the water column propagating away from the source at the speed of sound in water (with a typical value of around 1500 m/s) (1213).

Upon incidence at the seafloor (or seabed) (1214), the pressure wave is partially transmitted deeper into the subsurface as elastic waves of various types (1215-1217) and partially reflected upwards (1218). The elastic wave energy propagating deeper into the subsurface partitions whenever discontinuities in subsurface material properties occur. The elastic waves in the subsurface are also subject to an elastic attenuation which reduces the amplitude of the waves depending on the number of cycles or wavelengths.

Some of the energy reflected upwards (1220-1221) is sensed and recorded by suitable receivers placed on the seabed (1206-1208), or towed behind one or more vessels. The receivers, depending on the type, sense and record a variety of quantities associated with the reflected energy, for example, one or more components of the particle displacement, velocity or acceleration vector (using geophones, mems [microelectromechanical] or other devices, as is well known in the art), or the pressure variations (using hydrophones). The wave field recordings made by the receivers are stored locally in a memory device and/or transmitted over a network for storage and processing by one or more computers.

Waves emitted by the source in the upward direction also reflect downward from the sea surface (1219), which acts as a nearly perfect mirror for acoustic waves.

One seismic source typically includes one or more airgun arrays (1203-1205): that is, multiple airgun elements (1209-1211) towed in, e.g., a linear configuration spaced apart several meters and at substantially the same depth, whose air is released (near-) simultaneously, typically to increase the amount of energy directed towards (and emitted into) the subsurface.

Seismic acquisition proceeds by the source vessel (1202) sailing along many lines or trajectories (1222) and releasing air from the airguns from one or more source arrays (also known as firing or shooting) once the vessel or arrays reach particular pre-determined positions along the line or trajectory (1223-1225), or, at fixed, pre-determined times or time intervals. In FIG. 12, the source vessel (1202) is shown in three consecutive positions (1223-1225), also called shot positions.

Typically, subsurface reflected waves are recorded with the source vessel occupying and shooting hundreds of shots positions. A combination of many sail-lines (1222) can form, for example, an areal grid of source positions with associated inline source spacings (1226) and crossline source spacings. Receivers can be similarly laid out in one or more lines forming an areal configuration with associated inline receiver spacings (1227) and crossline receiver spacings.

The general practice of land seismic surveying is described below in relation to FIG. 13.

Prospecting for subsurface hydrocarbon deposits (1301) in a land environment (FIG. 13) is routinely carried out using one or more groups of so-called seismic vibrators (1302-1305) or other sources such as shotpipes or dynamite (not shown). Seismic vibrators transform energy provided by, e.g., a diesel engine into a controlled sequence of vibrations that radiate away from the vibrator as elastic waves (1306). More specifically, elastic waves emanate from a baseplate (1307), connected to a movable element whose relative motion realizes the desired vibrations through a piston-reaction mass system driven by an electro-hydraulic servo valve. The baseplate (1307) is applied to the ground for each vibration, then raised up so that the seismic vibrator can drive to another vibrating point (indicated by solid markers such as triangles, circles, squares and pentagons in FIG. 13). To transmit maximum force into the ground and to prevent the baseplate from jumping, part of the weight of the vibrator is used to hold down the baseplate.

Thus, one group of seismic sources could consist of the "array" of vibrators 1302 and 1303, while a second group of sources consists, e.g., of vibrators 1304 and 1305.

The elastic waves radiating away from the baseplate of the vibrators scatter, reflect (1308) and refract (1309) at locations or interfaces in the subsurface where the relevant material properties (e.g., mass density, bulk modulus, shear modulus) vary and are recorded at hundreds of thousand of individual/single sensors (1310) or at thousands of sensor groups (1311). Sensor signals from one or more sensors in a group can be combined or summed in the field before being sent sent to the recording truck (1312) over cables or wirelessly.

Source positions may lie along straight lines (1314) or various other trajectories or grids. Similarly, receiver positions may lay along lines oriented in a similar direction as the source lines, e.g., 1320, and/or oriented perpendicularly to the source lines (1321). Receivers may also be laid out along other trajectories or grids. The source spacing along the line (1315) is the distance the source in a group move between consecutive shotpoints. The inter source spacing (1316) is the distance between two sources in the same source group. Similarly, the receiver spacing is the spacing between individual receivers (e.g., 1318) in case single sensors or between sensor groups (e.g., 1317). The source line spacing (1319) is some representative distance between substantially parallel source lines and similarly for the receiver line spacing. Waves may be affected by perturbations in the near surface (1313) which obscure the deeper structure of interest (i.e., possible hydrocarbon bearing formations).

In land seismic data acquisition, the sensors on the ground are typically geophones.

Traditionally seismic data have been acquired sequentially: an impulsive source is excited and data are recorded until the energy that comes back has diminished to an acceptable level and all reflections of interest have been captured after which a new shot at a different shot location is excited. Being able to acquire data from several sources at the same time is clearly highly desirable. Not only would it allow to cut expensive acquisition time drastically or to better sample the wavefield on the source side which typically is much sparser sampled than the distribution of receiver positions. It would also allow for better illumination of the target from a wide range of azimuths as well as to better sample the wavefield in areas with surface obstructions. In addition, for some applications such as 3D VSP acquisition, or marine seismic surveying in environmentally sensitive areas, reducing the duration of the survey is critical to save cost external to the seismic acquisition itself (e.g., down-time of a producing well) or minimize the impact on marine life (e.g., avoiding mating or spawning seasons of fish species).

Simultaneously emitting sources, such that their signals overlap in the (seismic) record, is also known in the industry as "blending". Conversely, separating signals from two or more simultaneously emitting sources is also known as "deblending" and the data from such acquisitions as "blended data".

Simultaneous source acquisition has a long history in land seismic acquisition dating back at least to the early 1980's. Commonly used seismic sources in land acquisition are vibroseis sources which offer the possibility to design source signal sweeps such that it is possible to illuminate the sub-surface "sharing" the use of certain frequency bands to avoid simultaneous interference at a given time from different sources. By carefully choosing source sweep functions, activation times and locations of different vibroseis sources, it is to a large degree possible to mitigate interference between sources. Such approaches are often referred to as slip sweep acquisition techniques. In marine seismic data contexts the term overlapping shooting times is often used for related practices. Moreover, it is also possible to design sweeps that are mutually orthogonal to each other (in time) such that the response from different sources can be isolated after acquisition through simple cross-correlation procedures with sweep signals from individual sources. We refer to all of these methods and related methods to as "time encoded simultaneous source acquisition" methods and "time encoded simultaneous source separation" methods.

The use of simultaneous source acquisition in marine seismic applications is more recent as marine seismic sources (i.e., airgun sources) do not appear to yield the same benefits of providing orthogonal properties as land seismic vibroseis sources, at least not at a first glance. Western Geophysical was among the early proponents of simultaneous source marine seismic acquisition suggesting to carry out the separation is a pre-processing step by assuming that the reflections caused by the interfering sources have different characteristics. Beasley et al. (1998) exploited the fact that provided that the sub-surface structure is approximately layered, a simple simultaneous source separation scheme can be achieved for instance by having one source vessel behind the spread acquiring data simultaneously with the source towed by the streamer vessel in front of the spread. Simultaneous source data recorded in such a fashion is straightforward to separate after a frequency-wavenumber ($\omega k$) transform as the source in front of the spread generates data with positive wavenumbers only whereas the source behind the spread generates data with negative wavenumbers only.

Another method for enabling or enhancing separability is to make the delay times between interfering sources incoherent (Lynn et al., 1987). Since the shot time is known for each source, they can be lined up coherently for a specific source in for instance a common receiver gather or a common offset gather. In such a gather all arrivals from all other simultaneously firing sources will appear incoherent. To a first approximation it may be sufficient to just process the data for such a shot gather to final image relying on the processing chain to attenuate the random interference from the simultaneous sources (aka. passive separation). However, it is of course possible to achieve better results for instance through random noise attenuation or more sophisticated methods to separate the coherent signal from the apparently incoherent signal (Stefani et al., 2007; Ikelle 2010; Kumar et al. 2015). In recent years, with elaborate acquisition schemes to for instance acquire wide azimuth data with multiple source and receiver vessels (Moldoveanu et al., 2008), several methods for simultaneous source separation of such data have been described, for example methods that separate "random dithered sources" through inversion exploiting the sparse nature of seismic data in the time-domain (i.e., seismic traces can be thought of as a subset of discrete reflections with "quiet periods" in between; e.g., Akerberg et al., 2008; Kumar et al. 2015). A recent state-of-the-art land example of simultaneous source separation applied to reservoir characterization is presented by Shipilova et al. (2016). Existing simultaneous source acquisition and separation methods based on similar principles include quasi random shooting times, and pseudo random shooting times. We refer to all of these methods and related methods to as "random dithered source acquisition" methods and "random dithered source separation" methods. "Random dithered source acquisition" methods and "random dithered source separation" methods are examples of "space encoded simultaneous source acquisition" methods and "space encoded simultaneous source separation" methods.

A different approach to simultaneous source separation has been to modify the source signature emitted by airgun sources. Airgun sources comprise multiple (typically three) sub-arrays along which multiple clusters of smaller airguns are located. Whereas in contrast to land vibroseis sources, it is not possible to design arbitrary source signatures for marine airgun sources, one in principle has the ability to choose firing time (and amplitude i.e., volume) of individual airgun elements within the array. In such a fashion it is possible to choose source signatures that are dispersed as opposed to focused in a single peak. Such approaches have been proposed to reduce the environmental impact in the past (Ziolkowski, 1987) but also for simultaneous source shooting.

Abma et al. (2015) suggested to use a library of "popcorn" source sequences to encode multiple airgun sources such that the responses can be separated after simultaneous source acquisition by correlation with the corresponding source signatures following a practice that is similar to land simultaneous source acquisition. The principle is based on the fact that the cross-correlation between two (infinite) random sequences is zero whereas the autocorrelation is a spike. It is also possible to choose binary encoding sequences with better or optimal orthogonality properties such as Kasami sequences to encode marine airgun arrays (Robertsson et al., 2012). Mueller et al. (2015) propose to use a combination of random dithers from shot to shot with deterministically encoded source sequences at each shot point. Similar to the methods described above for land seismic acquisition we refer to all of these methods and related methods to as "time encoded simultaneous source acquisition" methods and "time encoded simultaneous source separation" methods.

Recently there has been an interest in industry to explore the feasibility of marine vibrator sources as they would, for instance, appear to provide more degrees of freedom to optimize mutually orthogonal source functions beyond just binary orthogonal sequences that would allow for a step change in simultaneous source separation of marine seismic data. Halliday et al. (2014) suggest to shift energy in $\omega$k-space using the well-known Fourier shift theorem in space to separate the response from multiple marine vibrator sources. Such an approach is not possible with most other seismic source technology (e.g., marine airgun sources) which lack the ability to carefully control the phase of the source signature (e.g., flip polarity).

SUMMARY

A recent development, referred to as "seismic apparition" (also referred to as signal apparition or wavefield apparition in this disclosure), suggests an alternative approach to deterministic simultaneous source acquisition that belongs in the family of "space encoded simultaneous source acquisition" methods and "space encoded simultaneous source separation" methods. Robertsson et al. (2016) show that by using modulation functions from shot to shot (e.g., a short time delay or an amplitude variation from shot to shot), the recorded data on a common receiver gather or a common offset gather will be deterministically mapped onto known parts of for instance the $\omega$k-space outside the conventional "signal cone" where conventional data is strictly located (FIG. 1a). The signal cone contains all propagating seismic energy with apparent velocities between water velocity (straight lines with apparent slowness of +/−1/1500 s/m in $\omega$k-space) for the towed marine seismic case and infinite velocity (i.e., vertically arriving events plotting on a vertical line with wavenumber 0). The shot modulation generates multiple new signal cones that are offset along the wavenumber axis thereby populating the $\omega$k-space much better and enabling exact simultaneous source separation below a certain frequency (FIG. 1b). Robertsson et al. (2016) referred to the process as "wavefield apparition" or "signal apparition" in the meaning of "the act of becoming visible". In the spectral domain, the wavefield caused by the periodic source sequence is nearly "ghostly apparent" and isolated. A critical observation and insight in the "seismic apparition" approach is that partially shifting energy along the $\omega$k-axis is sufficient as long as the source variations are known as the shifted energy fully predicts the energy that was left behind in the "conventional" signal cone. Following this methodology simultaneously emitting sources can be exactly separated using a modulation scheme where for instance amplitudes and or firing times are varied deterministically from shot to shot in a periodic pattern.

Conventionally, it has been suggested to combine different methods for simultaneous source acquisition. Müller et al. (2015) outline a method based on seismic data acquisition using airgun sources. By letting individual airguns within a source airgun array be actuated at different time a source signature can be designed that is orthogonal to another source signature generated in a similar fashion. By orthogonal, Müller et al. (2015) refer to the fact that the source signatures have well-behaved spike-like autocorrelation properties as well as low cross-correlation properties with regard to the other source signatures used. On top of the encoding in time using orthogonal source signatures, Müller et al. (2015) also employ conventional random dithering (Lynn et al., 1987). In this way, two different simultaneous source separation approaches are combined to result in an even better simultaneous source separation result.

Halliday et al. (2014) describe a method for simultaneous source separation using marine vibrator sources that relies on excellent phase control in marine vibrator sources to fully shift energy along the wavenumber axis in the frequency-wavenumber plane. Halliday et al. (2014) recognize that the method works particularly well at low frequencies where conventional random dithering techniques struggle. They suggest to combine the two methods such that their phase-controlled marine vibrator simultaneous source separation technique is used for the lower frequencies and simultaneous source separation based on random dithers is used at the higher frequencies.

The method of seismic apparition (Robertsson et al., 2016) allows for exact simultaneous source separation given sufficient sampling along the direction of spatial encoding (there is always a lowest frequency below which source separation is exact). It is the only exact method there exists for conventional marine and land seismic sources such as airgun sources and dynamite sources. However, the method of seismic apparition requires good control of firing times, locations and other parameters. Seismic data are often shot on position such that sources are triggered exactly when they reach a certain position. If a single vessel tows multiple sources acquisition fit for seismic apparition is simply achieved by letting one of the source being a master source such that this source is shot on position. The other source(s) towed by the same vessel then must fire synchronized in time according to the firing time of the first source. However, as all sources are towed by the same vessel the sources will automatically be located at the desired positions—at least if crab angles are not too extreme. In a recent patent application (van Manen et al., 2016a) we demonstrate how perturbations introduced by a varying crab angle can be dealt with in an apparition-based simultaneous source workflow. However, in a marine environment it may be more challenging to use seismic apparition if sources are towed behind different vessels that suffer delays before they reach their exact positions due to varying currents in the sea, etc. In addition, both in marine and land environments it may be difficult to coordinate firing times between different sources. For instance, in a land seismic survey, seismic data are often acquired using an array of vibroseis sources where each vibroseis array comprises for instance two or three vibroseis sources. In simultaneous source operations there will be two or more vibroseis arrays. Coordinating firing times between multiple vibroseis arrays to allow for seismic apparition may be challenging. However, within one vibroseis array, firing times can be coordinated such that seismic apparition can be used within each vibroseis array to separate the signals due to each vibroseis truck. Note that instead of varying firing times, we may also consider altering the phase of the sweeps emitted from the different vibroseis trucks (Halliday et al., 2014). Such an approach would allow for separation of individual responses within a vibroseis array which enables acquisition of true point-source land seismic data. This in turn will yield better data quality as local perturbations due to for instance static and near-surface effects can be corrected for instead of being blurred out within the footprint of the source array as is the case in conventional land seismic operations. Similar challenges also apply to simultaneous source acquisition of seismic data acquired on the seabed, in transition zone or in boreholes (e.g., VSP's or 3D VSP's).

It is herein proposed to use hybrid methods for simultaneous source separation where the method of seismic apparition is combined with other existing simultaneous source separation methods that allow for better separation where the seismic apparition method may perform sub-optimally (e.g., due to the inability to exactly control firing times) or that generally enhance the separation result exploiting other features of the source encoding than those exploited in the seismic apparition method Methods for separating or deblending wavefields generated by two or more sources contributing to a common set of measured or recorded signals are provided, where the contributions from different sources are partially encoded by means of the principles of signal apparition and partially by means of different source encoding techniques, suited for seismic applications and other purposes, substantially as shown in and/or described in connection with at least one of the figures, and as set forth more completely in the claims.

Advantages, aspects and novel features of the present disclosure, as well as details of an illustrated embodiment thereof, may be more fully understood from the following description and drawings.

BRIEF DESCRIPTION OF THE DRAWINGS

In the following description reference is made to the attached figures, in which:

FIG. 14 summarizes key steps in the methods proposed herein in a flowchart; and FIG. 15 illustrates hardware components of a computer.

DETAILED DESCRIPTION

The following examples may be better understood using a theoretical overview as presented below.

The slowest observable (apparent) velocity of a signal along a line of recordings in any kind of wave experimentation is identical to the slowest physical propagation velocity in the medium where the recordings are made. As a result, after a spatial and temporal Fourier transform, large parts of the frequency-wavenumber ($\omega$k) spectrum inside the Nyquist frequency and wavenumber tend to be empty. In particular, for marine reflection seismic data (Robertsson et al., 2015), the slowest observable velocity of arrivals corresponds to the propagation velocity in water (around 1500 m/s).

Figure 1:
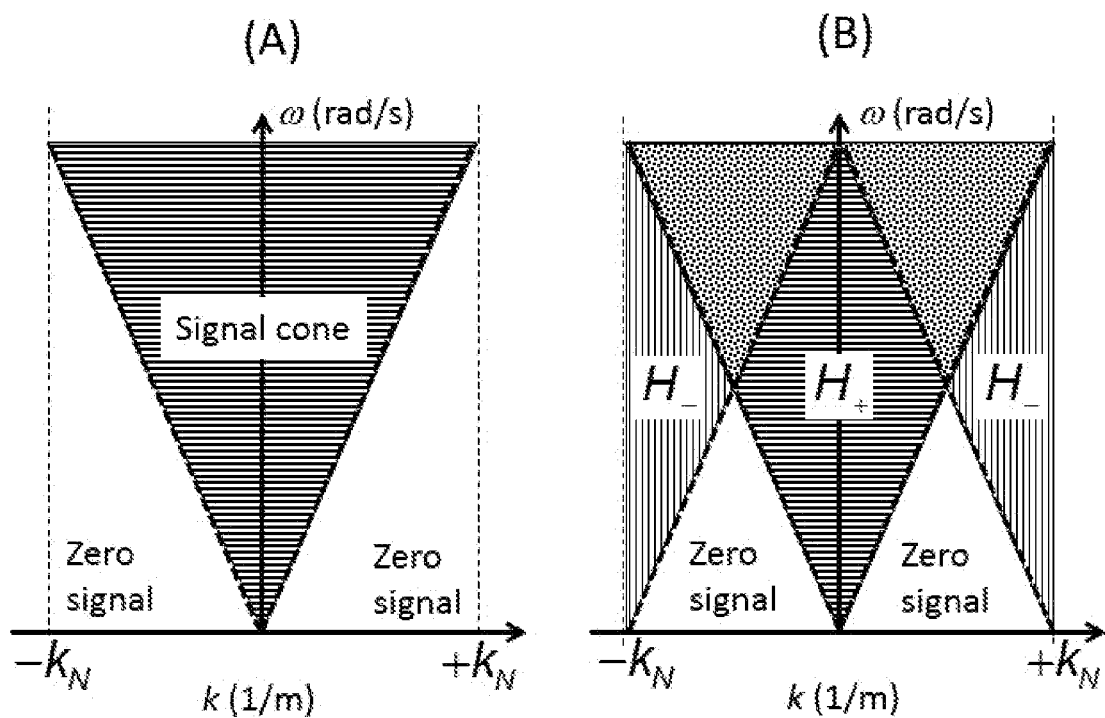
FIG. 1 illustrates how in a conventional marine seismic survey all signal energy of two source typically sits inside a "signal cone" (horizontally striped) bounded by the propagation velocity of the recording medium and how this energy can be split in a transform domain by applying a modulation to the second source.

FIG. 1 (A) illustrates how all signal energy when represented in or transformed into the frequency-wavenumber $\omega$k) domain sits inside a "signal cone" centered at k=0 and bounded by the propagation velocity of the recording medium.

In a wavefield experiment it may be that a source is excited sequentially for multiple source locations along a line while recording the reflected wavefield on at least one receiver. The source may be characterized by its temporal signature. In the conventional way of acquiring signals representing a wavefield the source may be excited using the same signature from source location to source location, denoted by integer n. Next, consider the alternative way of acquiring such a line of data using a periodic sequence of source signatures: every second source may have a constant signature and every other second source may have a signature which can for example be a scaled or filtered function of the first source signature. Let this scaling or convolution filter be denoted by a(t), with frequency-domain transform $A(\omega)$. Analyzed in the frequency domain, using for example a receiver gather (one receiver station measuring the response from a sequence of sources) recorded in this way, can be constructed from the following modulating function m(n) applied to a conventionally sampled and recorded set of wavefield signals:

$$m(n) = \tfrac{1}{2}[1+(-1)^n] + \tfrac{1}{2}A[1-(-1)^n],$$

which can also be written as $$m(n) = \tfrac{1}{2}[1+e^{i\pi n}] + \tfrac{1}{2}A[1-e^{i\pi n}]. \qquad (0.1)$$

By applying the function m in Eq. 0.1 as a modulating function to data f(n) before taking a discrete Fourier transform in space (over n), $F(k) = \mathcal{F}(f(n))$, the following result can be obtained:

$$\mathcal{F}(f(n)m(n)) = \frac{1+A}{2}F(k) + \frac{1-A}{2}F(k-k_N), \qquad (0.2)$$

which follows from a standard Fourier transform result (wavenumber shift) (Bracewell, 1999).

Eq. 0.2 shows that the recorded data f will be scaled and replicated into two places in the spectral domain as illustrated in FIG. 1 (B) and as quantified in Tab. I for different choices of $A(\omega)$.

| $A(\omega)$ | $H_- = (1-A)/2$ | $H_+ = (1+A)/2$ |
|---|---|---|
| 1 | 0 | 1 |
| −1 | 1 | 0 |
| 0 | ½ | ½ |
| ½ | ¼ | ¾ |
| $e^{i\omega T}$ | $1 - e^{i\omega T}/2$ | $1 + e^{i\omega T}/2$ |
| $1 + e^{i\omega T}$ | $-e^{i\omega T}/2$ | $1 + e^{i\omega T}/2$ |

TAB. I. Mapping of signal to cone centered at k=0 ($H_+$) and cone centered at $k=k_N$ ($H_-$) for different choices of $A(\omega)$ for signal separation or signal apparition in Eq. (0.2).

Part of the data will remain at the signal cone centered around k=0 (denoted by $H_+$ in FIG. 1(b)) and part of the data will be scaled and replicated to a signal cone centered around $k_N$ (denoted by $H_-$). It can be observed that by only knowing one of these parts of the data it is possible to predict the other.

This process may be referred to as "wavefield apparition" or "signal apparition" in the meaning of "the act of becoming visible". In the spectral domain, the wavefield caused by the periodic source sequence is nearly "ghostly apparent" and isolated.

A particular application of interest that can be solved by using the result in Eq. (0.2) is that of simultaneous source separation. Assume that a first source with constant signature is moved along an essentially straight line with uniform sampling of the source locations where it generates the wavefield g. Along another essentially straight line a second source is also moved with uniform sampling. Its signature is varied for every second source location according to the deterministic modulating sequence m(n), generating the wavefield h. The summed, interfering data f=g+h are recorded at a receiver location.

In the frequency-wavenumber domain, where the recorded data are denoted by F=G+H, the H-part is partitioned into two components $H_+$ and $H_-$ with $H=H_++H_-$ where the $H_-$ component is nearly "ghostly apparent" and isolated around the Nyquist-wavenumber [FIG. 1(B)], whereas G and $H_+$ are overlapping wavefields around k=0. Furthermore, $H_-$ is a known, scaled function of H. The scaling depends on the chosen $A(\omega)$ function (Tab. I), and can be deterministically removed, thereby producing the full appearance of the transformed wavefield H. When H is found, then G=F−H yielding the separate wavefields g and h in the time-space domain.

Although the above description has focused on acquisition along essentially straight lines, the methodology applies equally well to curved trajectories such as coil-shaped trajectories, circles, or other smoothly varying trajectories or sequences of source activations.

The concept may be extended to the simultaneous acquisition of more than two source lines by choosing different modulation functions for each source and it can be applied to higher dimensional source sampling in space (van Manen et al., 2016b).

Acquiring a source line where the first two source locations have the same signature, followed by two again with the same signature but modified from the previous two by the function $A(\omega)$ and then repeating the pattern again until the full source line has been acquired, will generate additional signal cones centered around $\pm k_N/2$.

FIG. 1 (B) also illustrates a possible limitation of signal apparition. The $H_+$ and $H_-$ parts are separated within the respective lozenge-shaped regions in FIG. 1 (B). In the triangle-shaped parts they interfere and may no longer be separately predicted without further assumptions and van Manen et al. (2016c) describe methods how to address this. In the example shown in FIG. 1 (B), it can therefore be noted that the maximum non-aliased frequency for a certain spatial sampling is reduced by a factor of two after applying signal apparition. Assuming that data are adequately sampled, the method nevertheless enables full separation of data recorded in wavefield experimentation where two source lines are acquired simultaneously.

As is evident from Tab. I, the special case A=1 corresponds to regular acquisition and thus produces no signal apparition. Obviously, it is advantageous to choose A significantly different from unity so that signal apparition becomes significant and above noise levels. The case where A=−1 (acquisition of data where the source signature flips polarity between source locations) may appear to be the optimal choice as it fully shifts all energy from k=0 to $k_N$ (Bracewell, 1999). Although this is a valid choice for modeling, it is not practical for many applications (e.g., for marine air gun sources, see Robertsson et al., 2015 as it requires the ability to flip polarity of the source signal. The case where A=0 (source excited every second time only) may be a straightforward way to acquire simultaneous source data but has the limitation of reduced sub-surface illumination. A particularly attractive choice of $A(\omega)$ for wave experimentation seems to let every second source be excited a time shift T later compared to neighbouring recordings, that is, select $A=e^{i\omega T}$.

It is well known, for example, that due to the "uncertainty principle", a function and its Fourier transform cannot both have bounded support. As (seismic) data are necessarily acquired over a finite spatial (and temporal) extent, the terms "bounded support" and "limited support" herein are used not in the strict mathematical sense, but rather to describe an "effective numerical support", that can be characterised, e.g., by the (amplitude) spectrum being larger than a certain value. For instance, larger than a certain noise threshold, or larger than the quantization error of the analog-to-digital converters used in the measurement equipment. Further, it is understood that by explicitly windowing space and/or space-time domain data, the support of a function may be spread over a larger region of, e.g., the wavenumber-frequency domain and in such cases the term "bounded support" and "limited support" will also be understood as "effective numerical support" as it will still be possible to apply the methods described herein.

Furthermore, the terms "cone" and "cone-shaped" used herein are used to indicate the shape of the "bounded" or "effective numerical" support of the data of interest (e.g., the data that would be recorded firing the sources individually [i.e. non-simultaneously]) in the frequency-wavenumber domain. In many cases, it will still be possible to apply the methods described herein if the actual support is approximately conic or approximately cone-shaped. For example, at certain frequencies or across certain frequency ranges the support could be locally wider or less wide than strictly defined by a cone. Such variations are contemplated and within the scope of the appended claims. That is, the terms "cone" and "cone-shaped" should be understood to include approximately conic and approximately cone-shaped. In addition, in some cases we use the terms "bounded support" or "limited support" and "effective numerical support" to refer to data with "conic support" or "cone-shaped support" even though in the strict mathematical sense a "cone" is not bounded (as it extends to infinite temporal frequency). In such cases, the "boundedness" should be understood to refer to the support of the data along the wavenumber axis/axes, whereas "conic" refers to the overall shape of the support in the frequency-wavenumber domain.

Note that the term "cone-shaped support" or similar refers to the shape of the support of e.g. the data of interest (in the frequency-wavenumber domain), if it were regularly sampled along a linear trajectory in 2D or Cartesian grid in 3D. That is, it refers only to the existence of such a support and not to the actual observed support of the data of interest in the simultaneous source input data or of the separated data of interest sampled as desired. The support of both of these depends on the chosen regularly or irregularly sampled straight or curved input (activation) and output (separation) lines or grids. Such variations are within the scope of the appended claims.

For example consider a case where the input data are acquired using simultaneous curved shot lines. In this case, the methods described herein can either be applied directly to the input data, provided the curvature has not widened the support of the data interest such that it significantly overlaps with itself. In this case, the support used in the methods described herein can be different from cone-shaped. Alternatively, the methods described herein are used to reconstruct the data of interest in a transform domain which corresponds to, e.g., best-fitting regularly sampled and/or straight activation lines or Cartesian grids, followed by computing the separated data of interest in the non-transformed domain at desired regular or irregularly sampled locations.

Van Manen et al. (2016a) describe the process of seismic apparition or wavefield apparition or signal apparition. In particular, the method includes the steps of:

First, obtaining wavefield recordings based on the activation of at least two sources along one or more activation lines varying at least one parameter between the sources from one activation to the following selected from one or more of a group consisting of source signal amplitude, source signal spectrum, source activation time, source location at activation time and source depth, such that the varying causes one or more scaled replications of a wavefield with effective numerical support in the frequency-wavenumber domain of at least one of the sources along the wavenumber axis or axes with the scaled replications partially overlapping a wavefield with effective numerical support of one or more of the other sources with the wavefield with effective numerical support the one or more of the other sources being not affected or also replicated and scaled by the varying; and Second, separating a contribution of at least one of the at least two sources to the obtained wavefield recordings as generated by the at least two sources individually in the absence of the other sources.

The above description assumes a modulating sequence m(n), and thus generating the wavefield h. In practice it is difficult to obtain perfectly periodic time shifts from a measurement setup. It is for example common practice for seismic vessels to shoot or trigger their sources at predetermined (essentially equidistant) positions, and due to practical variations (vessel velocity etc.) it will be difficult to realize shots at both predetermined locations and times.

Deviations from perfectly periodic acquisition can be termed non-periodic and grouped into non-periodic controlled (or intentional) and non-periodic uncontrolled cases (such as caused by currents, rough seas, etc., which are beyond influence by the acquisition crew). Furthermore, non-periodic acquisition can be composed of a periodic part, overlain by a non-periodic part. In all these cases, the signal cone will be scaled and replicated additional times along the wavenumber axis and the effects can be dealt with by various methods, including modelling and inverting such scaled replications using cyclic convolution functions as described in more detail later.

Note that periodic or aperiodic variations in source locations can similarly be used to apparate the wavefield signals. This can be understood for example by noting that a variation in the source location produces (angle-dependent) time shifts and therefore can be used to encode the data using the apparition methods described above.

For a sub-horizontally layered Earth, the recorded reflections from the interfaces between the strata lie (approximately) on hyperbolic trajectories in the space-time domain. The change in two-way traveltime of such reflections as a function of the source-receiver distance (or offset) is known as the normal moveout (NMO) and depends on the zero-offset two-way traveltime and the corresponding average sound speed in the overlying strata.

Correction of the normal moveout (NMO correction) is a standard procedure in seismic data processing which aims to remove the offset dependent part of the traveltime and align the reflected arrivals according to their zero-offset traveltime such that they can be summed yielding an initial "stack image" of the subsurface with increased signal-to-noise ratio.

NMO correction is a very efficient way to reduce the maximum time-dip in the recorded data. On the other hand NMO correction tends to stretch the data at large offsets and at early times, effectively changing (lowering) the frequency content in a space- and time-dependent manner. Let us consider the effect of NMO correction on simultaneous source data that have been acquired using e.g. seismic apparition, or similar, principles.

Because of the stretch, it follows that the NMO correction also modifies the apparition encoding filters $\alpha(t)$ in an offset- and time-dependent manner. This can be ignored if the apparated and unapparated signal cones are sufficiently narrow such that the cones can be directly separated without suffering from significant aliasing effects. In that case, the cones can first be separated and inverse moveout corrected, before applying the herein described apparition decoding techniques.

On the other and, note that the effects of NMO correction can be accurately predicted or modelled either from theory and first principles and/or numerical experiments. For example, if the encoding filters used were pure time delays, then the time delay after NMO correction can be predicted accurately by multiplying with an expression for NMO stretch due to Barnes (1992):

$$\beta = \frac{t_x}{t_0 - \frac{x^2 v'(t_0)}{v^3(t_0)}} \quad (0.3)$$

where $$t_x = \sqrt{t_0^2 - \frac{x^2}{v_{rms}^2(t_0)}}$$

Alternatively, the space-time dependent effect of the NMO correction on encoding filters can be considered by evaluating the effect of NMO correction at $t_0$ on a discrete delta function $\delta(t-t_x)$ and on $a(t)*\delta(t-t_x)$, respectively, and computing, e.g., the ratio of the resulting responses in the frequency domain. This yields a time- and offset-dependent frequency filter which can be used to predict the effective modulation function (also time- and offset dependent in general) after NMO correction.

Thus, an effective modulation function takes into account, e.g., the space-time dependent effects of the NMO correction, or any other coordinate transform, on the encoding filters.

The well-known convolution theorem states that convolution in the time or space domain corresponds to multiplication in the temporal frequency or spatial frequency domain, respectively. The lesser-known dual of the convolution theorem states that multiplication in the space domain of d(n) with a so-called modulation operator m(n), corresponds to cyclic convolution of the (discrete) Fourier transform of the data, D(k), with the (discrete) Fourier transform of the modulation operator $M(k)=\mathcal{F}(m(n))$, followed by inverse (discrete) Fourier transform. Further, we note that cyclic convolution can be implemented conveniently as a matrix multiplication or using computationally fast methods such as the fast Fourier transform (FFT).

Thus, for general aperiodic modulation functions, the recorded simultaneous source data can be modelled in the frequency-wavenumber domain as the sum of the fk-domain wavefields due to the individual sources, multiplied by one or more corresponding cyclic convolution matrices. Then, the fk-domain wavefields due to the individual sources can be obtained by inverting the data through the model. Note that in this context, here and elsewhere, setting up and solving a system of equations can equally be understood as modelling and inversion, respectively.

Note that the effect of a general aperiodic modulation as compared to a periodic modulation can thus be understood as introducing additional, scaled replications (beyond the replications at (multiples of) +/− Nyquist horizontal wavenumber) of the individual signal cones of the sources, which describe the known to be compact support of the sources, along the wavenumber axis/axes. Both the position and the scaling factor of the replications then are exactly given by the (discrete) Fourier transform of the aperiodic modulation function.

Finally, the S-transform (Stockwell, 1996) decomposes a time-signal into a time-frequency representation, localizing signals in both time and frequency. It provides a frequency-dependent resolution in accordance with the uncertainty principle while maintaining a direct relationship with the Fourier spectrum.

It is possible, then, to use the cyclic convolution principle in conjunction with the S-transform (or similar time-frequency decomposition) and NMO correction to improve the separation of aliased simultaneous source data, acquired, e.g., using seismic apparition principles, in the following manner:

1. NMO correct the (partially) aliased simultaneous source recordings using an invertible NMO transform, effectively reducing the maximum time-dip in the data.
2. Compute the S-transform of each NMO corrected simultaneous source trace. The resulting time-frequency representation implies a frequency spectrum for every time sample of every trace.
3. Iterate over all time samples of the S-transformed NMO-corrected sim source traces. For every time sample:
   a. Compute the offset (and current time) dependent effect of NMO stretch on the encoding filters using, e.g., Eq. 0.3 from Barnes (1992), providing the frequency spectrum of the effective encoding filters.
   b. Loop over all the (positive/negative) frequencies. For every frequency do:
      i. Compute the wavenumber transform of the S-transformed NMO-corrected simultaneous source data at the current time sample and frequency.
      ii. Compute the wavenumber transform of the effective modulation function.
      iii. Using the cyclic convolution principle and the computed wavenumber transform of the effective modulation function, compute a forward modelling operator that relates the source one and source two contributions at the current time sample and frequency to the corresponding sim source data.
      iv. Invert the sim source data at the current time sample and current frequency using the forward modelling operator.
      v. Compute the inverse wavenumber transform of the inverted source one and source two contributions and store the results.
   c. Optional (if all the frequencies are computed): Compute the negative frequencies from the positive frequencies using complex conjugate mirroring.
   d. Store the separated frequency spectra for the current time-step building the S-transforms of the separated data one time sample by one.
4. Inverse S-transform the obtained S-transform data for source one and source two, obtaining the NMO corrected separated source one and source two data.
5. Inverse NMO correct separated s1 and s2 data.

The list of steps is merely included for completeness of the description of a method which improves the separation of aliased simultaneous source data.

The NMO is a coordinate transformation that reduces the spatial bandwidth of the recorded data, and therefore limiting the effect of aliasing. We now proceed to discuss methods that use other coordinate transformations, and also how several coordinate transformations can be used simultaneously. Moreover, we also discuss how to make reconstruction in two steps: First by making partial reconstructions, using only the non-aliased parts; and secondly to use these partial reconstructions to regularize and solve the full reconstruction problem by means of directionality estimates, that imply local coordinate transformations specifying directions with reduced bandwidth, and hence, reduced aliasing effects.

Further, to provide a more complete summary of methods for dealing with aliased simultaneous source data, we review the notation and recapitulate the theory for regular seismic apparition. We use the notation $$\hat{f}(\xi) = \int_{-\infty}^{+\infty} f(x) e^{-2\pi i x \xi} dx,$$

for the Fourier transform in one variable, and consequently $\hat{f}(\omega, \xi)$ for the Fourier transform of two dimensional function $f(t,x)$ with a time (t) and spatial (x) dependence.

Suppose that $f_1 = f_1(t,x)$ and $f_2 = f_2(t,x)$ are two function with frequency support in two cones of the form $$\frac{\omega^2}{c^2} \geq \xi^2. \tag{1}$$

The constraint comes from assuming that the functions $f_1$ and $f_2$ represent the recording of a wavefield at time t at a fixed receiver coordinate, source coordinate x, and fixed depth, where the recorded wave field at this depth is a solution to the homogeneous wave equation with a velocity c. The wavefields are generated at discrete values of x which we assume to be equally spaced, i.e. of the form $x = \Delta_x k$.

We now assume that the two sources are used simultaneously, in such a way that their mixture takes the form $$d(t,k) = f_1(t, k\Delta_x) + f_2(t - \Delta_t(-1)^k, k\Delta_x)$$

$$= \mathcal{F}^*(\hat{f}_1)(t, k\Delta_x) + \mathcal{F}^*(\hat{f}_2(\omega, \xi) e^{-2\pi i (-1)^k \Delta_t \omega})(t, k\Delta_x),$$

i.e., the recorded data is now modelled as a sum of the two functions, but where one of them has been subjected to a periodic time shift. In a more general version more general filtering operations than time shifts can be applied. Let $a_k$ be filter operators (acting on the time variable) where the k dependence is such it only depends on if k is odd or even, i.e., that $a_k = a_{k(mod\ 2)}$.

$$d(t,k) = f_1(t, k\Delta_x) + a_k f_2(t - \Delta_t(-1)^k, k\Delta_x) \tag{2}$$

$$= \mathcal{F}^*(\hat{f}_1)(t, k\Delta_x) + \int a_k(\omega) \int \hat{f}_2(\omega, \xi)$$

$$e^{2\pi i k \Delta_x \xi} d\xi e^{2\pi i (t-(-1)^k \Delta_t) \omega} d\omega$$

$$= \mathcal{F}^*(\hat{f}_1)(t, k\Delta_x) + (\mathcal{J}\mathcal{F}^*(\hat{f}_2))(t, k\Delta_x),$$

It can be shown that $$D_1(\omega, \xi) = \int_{-\infty}^{\infty} \sum_{k=-\infty}^{\infty} d(t,k) e^{-2\pi i (k\Delta_x \xi + t\omega)} dt = \left( \sum_{k=-\infty}^{\infty} \hat{f}_1\left(\omega, \xi + \frac{k}{\Delta_x}\right) \right) + \tag{3}$$

$$\left( \sum_{k=-\infty}^{\infty} \hat{f}_2\left(\omega, \xi + \frac{k}{2\Delta_x}\right) \right) \frac{1}{2} (\hat{a}_0(\omega) e^{-2\pi i \Delta_t \omega} + (-1)^k \hat{a}_1(\omega) e^{2\pi i \Delta_t \omega}).$$

Now, due to the assumption of conic support of $\hat{f}_1$ and $\hat{f}_2$ it holds that if $$|\xi| < \frac{|\omega|}{c}, |\omega| < c\left|\xi - \frac{1}{\Delta_x}\right|, |\omega| < c\left|\xi + \frac{1}{\Delta_x}\right|, \tag{4}$$

then only the terms where k=0 above contribute, and the following simplified relation holds $$D_1(\omega, \xi) = \hat{f}_1(\omega, \xi) + \hat{f}_2(\omega, \xi) \frac{\hat{a}_0(\omega) e^{-2\pi i \Delta_t \omega} + \hat{a}_1(\omega) e^{2\pi i \Delta_t \omega}}{2}.$$

In a similar fashion it holds for $$D_2(\omega, \xi) = \int_{-\infty}^{\infty} \sum^k d(t + \Delta_t(-1)^k, k) e^{-2\pi i (k\xi + t\omega)} dt, \tag{5}$$

$$= \hat{f}_1 \cos(2\pi \Delta_t \omega)(\omega, \xi) + \hat{f}_2(\omega, \xi) \frac{\hat{a}_0(\omega) + \hat{a}_1(\omega)}{2}.$$

This implies that for each pair $(\omega, \xi)$ satisfying (4), the values of $\hat{f}_1(\omega, \xi)$ and $\hat{f}_2(\omega, \xi)$ can be obtained by solving the linear system of equations $$\begin{pmatrix} 1 & \frac{\hat{a}_0(\omega) e^{-2\pi i \Delta_t \omega} + \hat{a}_1(\omega) e^{2\pi i \Delta_t \omega}}{2} \\ \cos(2\pi \Delta_t \omega) & \frac{\hat{a}_0(\omega) + \hat{a}_1(\omega)}{2} \end{pmatrix} \begin{pmatrix} \hat{f}_1(\omega, \xi) \\ \hat{f}_2(\omega, \xi) \end{pmatrix} = \tag{6}$$

$$\begin{pmatrix} D_1(\omega, \xi) \\ D_2(\omega, \xi) \end{pmatrix}.$$

Figure 2:
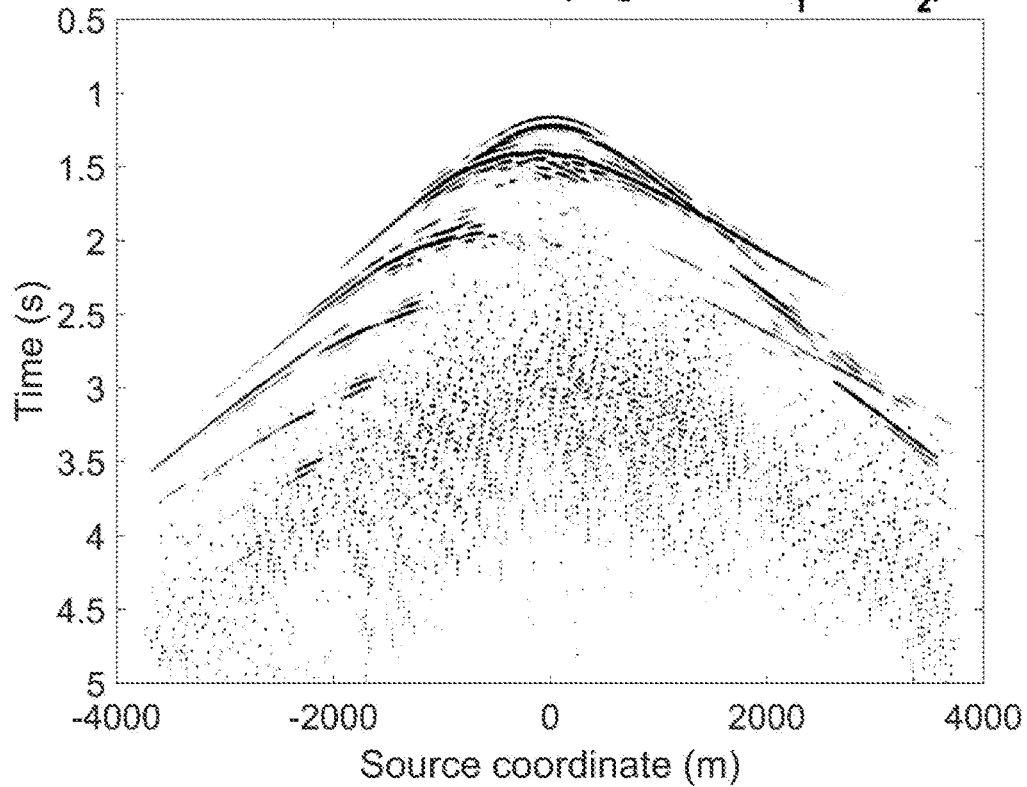
FIG. 2 shows a common-receiver gather from the simultaneous source complex salt data example with all four sources firing simultaneously in the reference frame of the firing time of sources 1 and 2.

This provides information on how to recover the wavefields $f_1$ and $f_2$ for frequencies either up to the limit $c/(4 \Delta_x)$, or more generally, satisfying the (diamond shaped) condition (4). The overlaps of the cones are illustrated in FIG. 2, where the left panel shows horizontally striped the cone given by (1), and the right panel the diamond shaped region described by (4). In this approach the deblending takes place by considering the data available in the central cone of FIG. 2.

An alternative approach for reconstruction, is by noting that if either of the support constraints (1) or (4) are satisfied, then it holds that for the values of $(\omega, \xi)$ of interest that (3) reduces for instance to $$D_1\left(\omega, \xi - \frac{1}{2\Delta_x}\right) = \hat{f}_2(\omega, \xi) \frac{1}{2} (\hat{a}_0(\omega) e^{-2\pi i \Delta_t \omega} + (-1)^k \hat{a}_1(\omega) e^{2\pi i \Delta_t \omega}),$$

implying that $\hat{f}_2(\omega, \xi)$ can be recovered from $$D_1\left(\omega, \xi - \frac{1}{2\Delta_x}\right).$$

In a similar fashion, $\hat{f}_1(\omega, \xi)$ can be recovered from $$D_2\left(\omega, \xi - \frac{1}{2\Delta_x}\right).$$

In this way, the deblending can be achieved by direct consideration of the data in the shifted cones illustrated in FIG. 2.

From (6) it is possible to recover the functions $f_1$ and $f_2$ partially. Let $w$ be a filter such that $\hat{w}$ has support inside the region described by (4). It is then possible to recover $$h_1 = w*f_1, h_2 = w*f_2. \tag{7}$$

For values of $(\omega,\xi)$ outside the region described by (4), it is not possible to determine $\hat{f}_1(\omega,\xi)$ and $\hat{f}_2(\omega,\xi)$ uniquely without imposing additional constraints. Typically, seismic data can locally be well described by sums of plane waves with different directions. The plane waves carry the imprint of the source wavelet, and according to ray theory the data from such a plane event should have the same directionality for the frequency range that covers the source wavelet. We can use this information to construct a directionality penalty that we can use for the separation of the two wavefields $f_1$ and $f_2$ from the blended data d. This directionality penalty is equivalent to, by means of local coordinate transformations, imposing a bandwidth limitation in undesired directions for the purpose of suppressing aliasing.

One way of estimating local directionality is by means of so-called structure tensors. For the two known wavefields $h_1$ and $h_2$ the corresponding structure tensors are defined as $$T_1(t,x) = \begin{pmatrix} \left(K*\left(\frac{\partial h_1}{\partial t}\right)^2\right)(t,x) & \left(K*\frac{\partial h_1 \partial h_1}{\partial t \partial x}\right)(t,x) \\ \left(K*\frac{\partial h_1 \partial h_1}{\partial t \partial x}\right)(t,x) & \left(K*\left(\frac{\partial h_1}{\partial t}\right)^2\right)(t,x) \end{pmatrix},$$

and similarly for $T_2$ and $h_2$. Above, the function K describes a smooth, localizing windows, for instance a Gaussian. The eigenvalues of $T_1$ and $T_2$ will point-wise describe the local energy in the direction of maximum and minimum variation, and the associated eigenvectors contain the corresponding directions. The tensors are computed as elementwise convolutions of the outer product of the gradient of the underlying function, and this directly defines the generalization to higher dimensions. For the sake of simplicity, we describe here the two-dimensional case.

Let $s_1^1(t,x)$ and $s_2^1(t,x)$ be the eigenvalues of $T_1(t,x)$, and let $e_1^1(t,x)$ and $e_2^1(t,x)$ denote the corresponding eigenvectors. If the wavefield $f_1$ only has energy in one direction in the vicinity around $(t,x)$ covered by K, then this implies that $$s_2^1(t,x)=0,$$

which in turn means that $$\nabla f_1 \cdot e_2^1 = 0. \tag{8}$$

The eigenvectors $e_1^1(t,x)$ and $e_2^1(t,x)$ define local coordinate transformation that describe directions of large and small variations. Along the directions specified by $e_2^1(t,x)$ only low-frequency components are to be dominant, and by suppressing the bandwidth of the reconstructions in these directions is an efficient way of de-aliasing the separated sources.

This property (8) is clearly not always satisfied (although counterparts in higher dimension hold more frequently with increased dimensionality), however it is a property that can be used as a penalty from which the blended data can be deblended. Even if (8) is not satisfied, the relation can be used to minimize the energy of the deblended data in the directions carried from $h_1$ and $h_2$, respectively.

From (8) we have a condition on the gradient of $f_1$ and $f_2$ when one the eigenvectors vanishes. For the more general case, we would need to formulate a penalty function that can deal with the cases where the components change gradually, and at places where the eigenvectors are equal in size, and equal amount of penalty should be used for the two directions. One such choice is to define $$S(T_m) = \sum_{j=1}^{2} s_j(\sigma) e_j^m (e_j^m)^T, \quad T_m = \sum_{j=1}^{2} \sigma_j e_j^m (e_j^m)^T$$

with $$s_1(\sigma) = \frac{1}{2} \cdot \frac{\sigma_2^2}{\sigma_1^2} \exp\left(-\frac{1}{2} \cdot \frac{\sigma_2}{\sigma_1}\right)$$

$$s_2(\sigma) = \left(1 - \frac{1}{2} \cdot \frac{\sigma_2^2}{\sigma_1^2}\right) \exp\left(-\frac{1}{2} \cdot \frac{\sigma_2}{\sigma_1}\right).$$

These functions have the property that $$\lim_{\sigma_2 \to 0} (s_1, s_2) \to (0,1)$$

and $$s_1(\sigma_1, \sigma_1) = s_2(\sigma_1, \sigma_1).$$

implying that (8) will be satisfied in the case where there is locally only energy in one direction, and where an equal amount of penalty will be applied in the case where there is the same amount of energy in both directions. Note that the local coordinate transformations are now implicitly given in the operator S.

This definition now allows for the generalization of (8) to penalty functionals $$\iint ((\nabla f_1)^T S(T_1) \nabla f_1)(t,x) dt dx,$$

and $$\iint ((\nabla f_2)^T S(T_2) \nabla f_2)(t,x) dt dx,$$

for the two wavefields. The expressions above describe the energy in the undesirable direction, given the knowledge of the bandpass filtered versions $h_1$ and $h_2$, respectively. The de-aliasing is now taken place by punishing high frequencies (by the derivatives) along the directions given by the local coordinate transformations specified by $e_1^1(t,x)$ and $e_2^1(t,x)$.

Before we use these expressions to define a minimization problem that describes the deblending procedure, we incorporate the original cone condition (1) in the formulation. To this end, we will now work with sampled representations of $\hat{f}_1$ and $\hat{f}_2$. In the following, redefining the notation, we will also use $\hat{f}_1$ and $\hat{f}_2$ to denote these sampled values.

We let $\mathcal{F}_c^*$ denote the inverse Fourier operator that is restricted to functions supported on the cone defined by (1). Recall the definition of the apparition operator $\mathcal{T}$ from (2). The relationship (2) is then satisfied for (the non-unique) solutions to $$\min_{\hat{f}_1, \hat{f}_2} \left\| \mathcal{F}_c^* \hat{f}_1 + \mathcal{T} \mathcal{F}_c^* \hat{f}_2 - d \right\|^2,$$

with the additional constraint that $\hat{f}_1$ and $\hat{f}_2$ have support on the cone defined by (1). To obtain a unique approximate solution, we now add the directionality penalties and consider $$\min_{\hat{f}_1,\hat{f}_2} \left\| \mathcal{F}_c^* \hat{f}_1 + \mathcal{JF}_c^* \hat{f}_2 - d \right\|^2 + \tag{9}$$

$$\int\int \left( (\nabla(\mathcal{F}_c^*\hat{f}_1))^T S(T_1) \nabla(\mathcal{F}_c^*\hat{f}_1) \right)(t,x) dt dx +$$

$$\int\int \left( (\nabla(\mathcal{F}_c^*\hat{f}_2))^T S(T_2) \nabla(\mathcal{F}_c^*\hat{f}_2) \right)(t,x) dt dx.$$

with the same cone constraint. To find the minima of (9), we compute the Fréchet derivatives of the objective function (9) with respect to the functions $\hat{f}_1$ and $\hat{f}_2$ and equate them to zero as they should at a minimum. The first term in (9) is straightforward to derive, and concerning the other two terms it is readily verified using partial integrations that their Fréchet derivatives are described by the elliptic operators $$D_m(f) = -\nabla(S(T_m)\nabla f).$$

To formulate the solution to (9), let $$b_1 = \mathcal{F}_c d, b_2 = \mathcal{F}_c \mathcal{T} d,$$

Furthermore, introduce $$A_F = \begin{pmatrix} \mathcal{F}_c \mathcal{F}_c^* & \mathcal{F}_c \mathcal{T} \mathcal{F}_c^* \\ \mathcal{F}_c \mathcal{T}^* \mathcal{F}_c^* & \mathcal{F}_c \mathcal{F}_c^* \end{pmatrix},$$

and $$A_D = \alpha \begin{pmatrix} \mathcal{F}_c D_1 \mathcal{F}_c^* \\ \mathcal{F}_c D_2 \mathcal{F}_c^* \end{pmatrix}.$$

Equating the Fréchet derivatives of (9) with respect to $\hat{f}_1$ and $\hat{f}_2$ to zero then yield the linear relationship $$(A_F \ A_D) \begin{pmatrix} \hat{f}_2 \\ \hat{f}_1 \end{pmatrix} = \begin{pmatrix} b_1 \\ b_2 \end{pmatrix} \tag{10}$$

for the solution of (9). This equation can be solved using an iterative solver for linear equations, for instance the conjugate gradient method. The operators in $A_F$ are realized using standard FFT, and the operators in $A_D$ are computed using a combination of Fourier transforms and differential schemes, that also may be implemented by using FFT. The operator $A_F$ describe the fit to data, while the operator $A_D$ describe the de-aliasing that takes places using the local coordinate transformations induced from $e_1^1(t,x)$ and $e_2^1(t,x)$.

Simultaneous Source Separation of Seismic Data Encoded Using Both Principles of Seismic Apparition as Well as Other Simultaneous Source Separation Techniques As discussed above, simultaneous source separation using seismic apparition with multiple source vessels and/or multiple land sources or source arrays can be challenging (e.g., in a marine where there is a requirement to shoot on position). To some extent such undesired perturbations can be compensated for by using the method by van Manen et al. (2016a). However, in this disclosure we suggest to instead use other existing simultaneous source acquisition methods (for instance using random dithers between multiple source vessels or encoding functions in time) to complement seismic apparition simultaneous source separation or to enhance its performance.

For example, let us consider a marine seismic survey where we are acquiring a survey with six sources shooting simultaneously towed by two separate vessels. Vessel A tows sources 1, 2 and 3 whereas vessel B tows sources 4, 5 and 6. Sources 1, 2 and 3 are encoded relative to each other using seismic apparition acquisition encoding sequences and are referred to as a group of sources. Likewise, sources 4, 5 and 6 are encoded relative to each other also using seismic apparition acquisition encoding sequences and are referred to as a second group of sources. An example is to encode sources 1, 2 and 3 against sources 4, 5 and 6 using a conventional random dithers source acquisition pattern which can be random (i.e., the two groups of sources are encoded against each other using random dithers). The advantage of this approach is that we can capitalize on the following facts:

First, simultaneous source separation using seismic apparition is highly accurate and works very well for sources spaced closely to each other (where random dithered source acquisition and separation methods may struggle as there is little differentiation in dip of the data to help with the source separation process).

Second, random dithered source acquisition and separation does not require the synchronization of shots from the different vessels. Moreover, such methods work reasonably well for sources that are far from each other.

Third, all data for all sources can be shot on position.

Fourth, we are intrinsically benefitting from the power of simultaneous source separation of both techniques without compromising on accuracy as the two approaches are fundamentally different.

In a preferred workflow, the dithered simultaneous source separation is first carried out after which seismic apparition separation is carried out on the separated dithered simultaneous source data sets.

We anticipate that the proposed simultaneous source acquisition method will be important for both towed marine (WAZ) multi-vessel operations, seabed acquisition using multiple vessels as well as for land where vibroseis source arrays can be (intra-array) encoded using seismic apparition while shooting simultaneously with different vibroseis source arrays (also encoded using seismic apparition). In the acquisition of borehole recorded and/or borehole generated wavefield data like VSP's and 3D VSP's we also expect similar advantages using the present disclosure.

Example

As an example we have applied one embodiment of the simultaneous source separation methodology presented here to a synthetic data set generated using an acoustic 3D finite-difference solver and a model based on salt-structures in the sub-surface and a free-surface bounding the top of the water layer. A common-receiver gather located in the middle of the model was simulated using this model for a total of four shotlines simulating two vessels acquiring two shotlines each with two sources on each vessel shooting simultaneously and the two vessels also shooting simultaneously with respect to each other. Vessel A tows source 1 at 150 m cross-line offset from the receiver location as well as source 2 at 175 m cross-line offset from the receiver location. Vessel B tows source 3 at 1500 m cross-line offset from the receiver location as well as source 4 at 1525 m cross-line offset from the receiver location. The source wavelet comprises a Ricker wavelet with a maximum frequency of 30 Hz.

Sources 1 and 2 towed behind Vessel A are encoded against each other using signal apparition with a modulation periodicity of 2 and a 12 ms time-delay such that Source 1 fires regularly and source 2 has a time delay of 12 ms on all even shots.

Similarly, sources 3 and 4 towed behind Vessel B are encoded against each other using signal apparition with a modulation periodicity of 2 and a 12 ms time-delay such that Source 3 fires regularly and source 4 has a time delay of 12 ms on all even shots.

On top of the signal apparition encoding the sources towed by Vessel B (sources 3 and 4) also has a random dither time delay (random dithers between 0 s and 1200 ms) from shot to shot which is identical for both sources.

Figure 3:
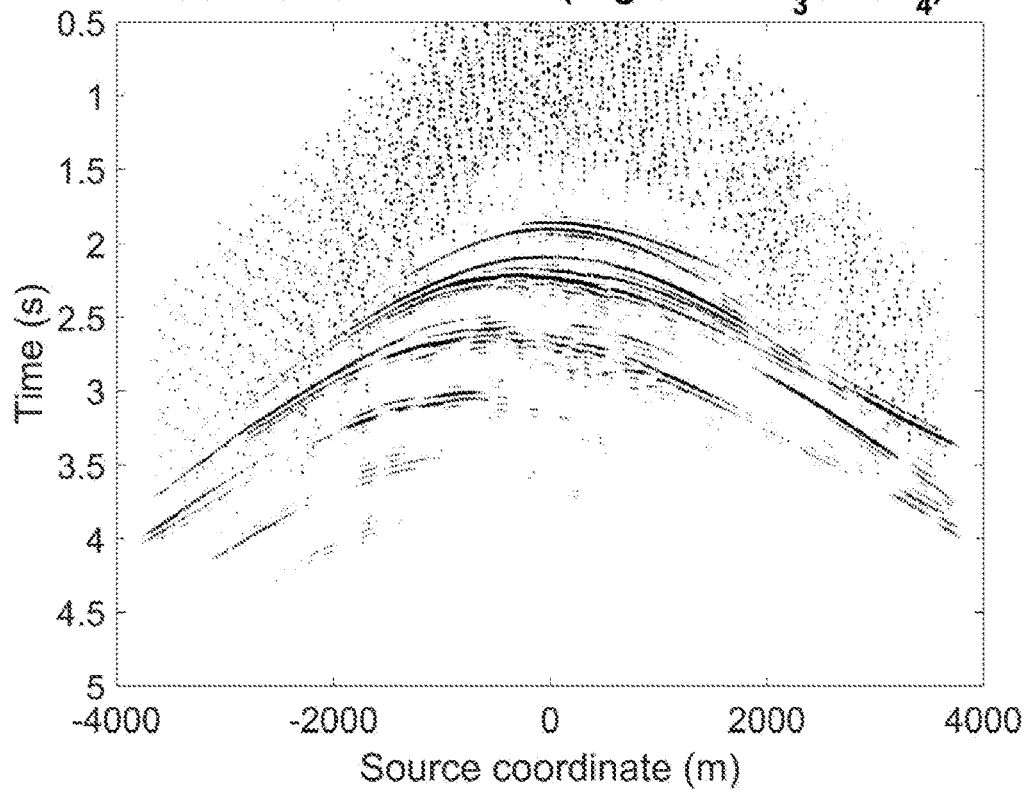
FIG. 3 shows a common-receiver gather from the simultaneous source complex salt data example with all four sources firing simultaneously in the reference frame of the firing time of sources 3 and 4.
Figure 4:
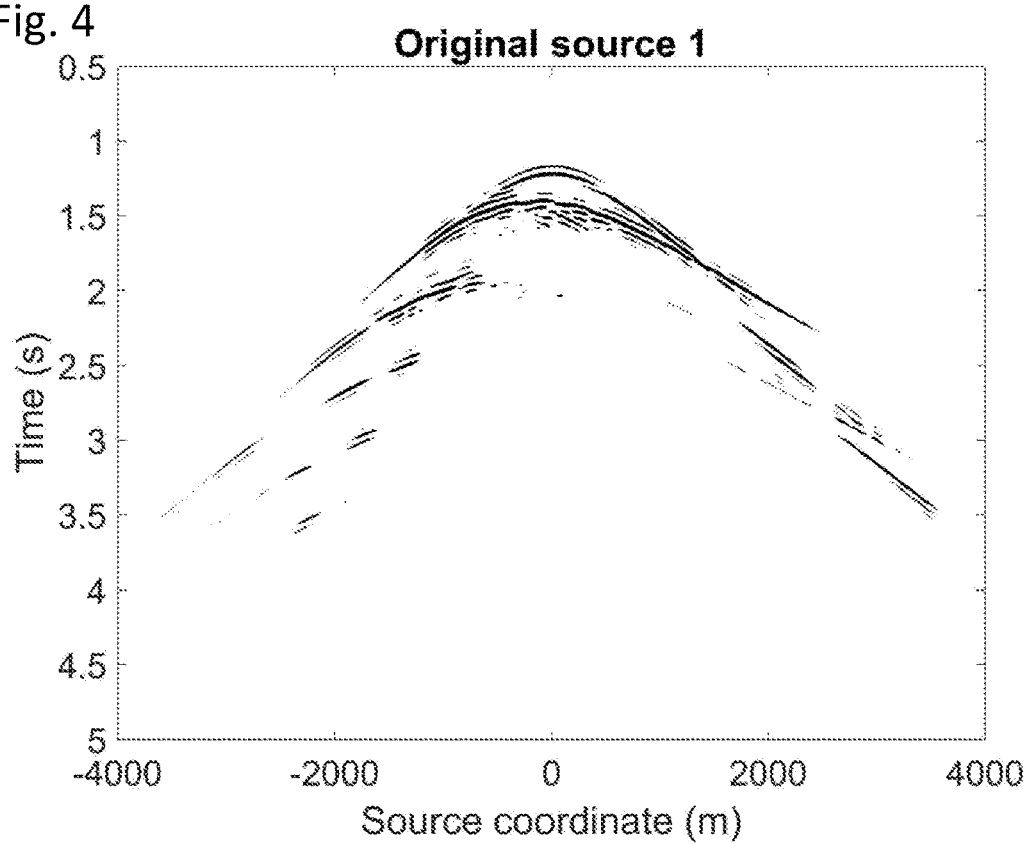
FIG. 4 shows a common-receiver gather from the simultaneous source complex salt data example with only source 1 firing as a reference solution.
Figure 5:
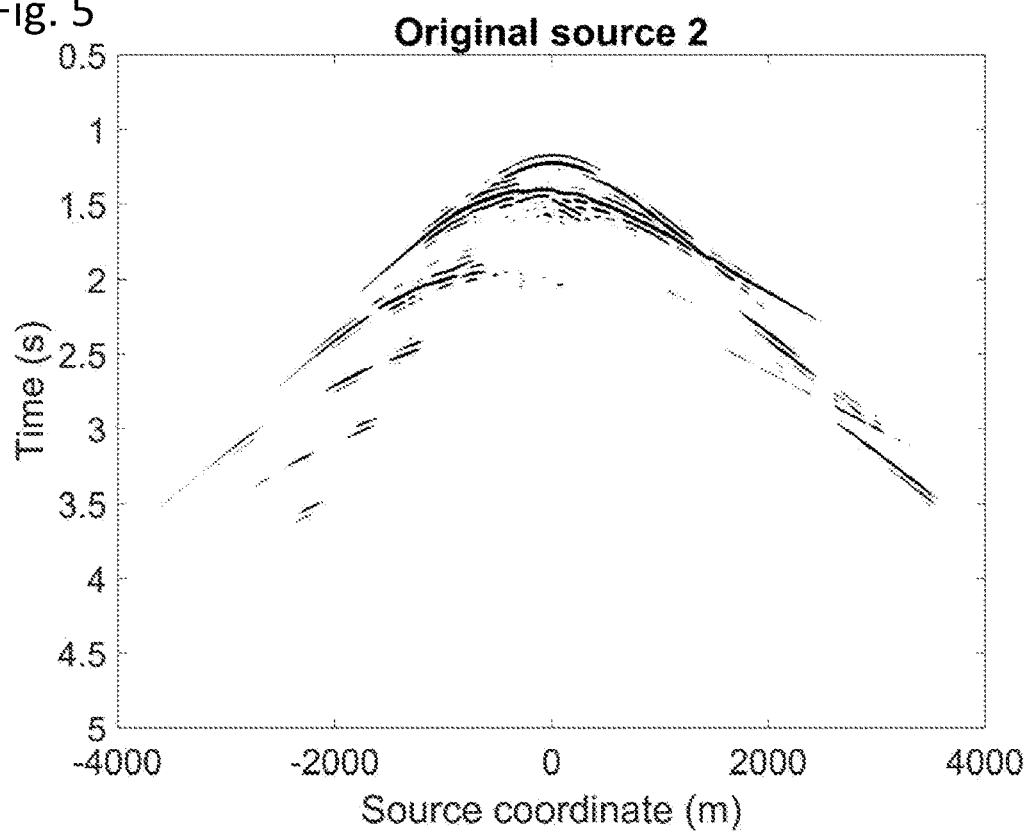
FIG. 5 shows a common-receiver gather from the simultaneous source complex salt data example with only source 2 firing as a reference solution.
Figure 6:
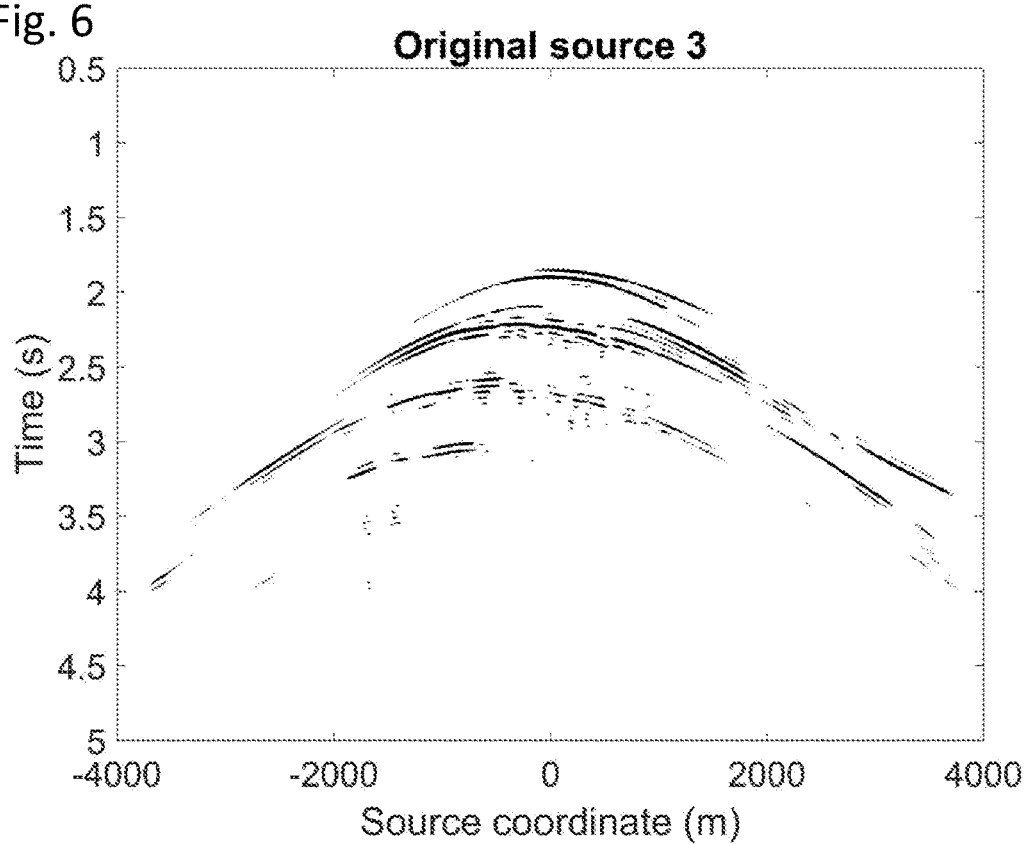
FIG. 6 shows a common-receiver gather from the simultaneous source complex salt data example with only source 3 firing as a reference solution.
Figure 7:
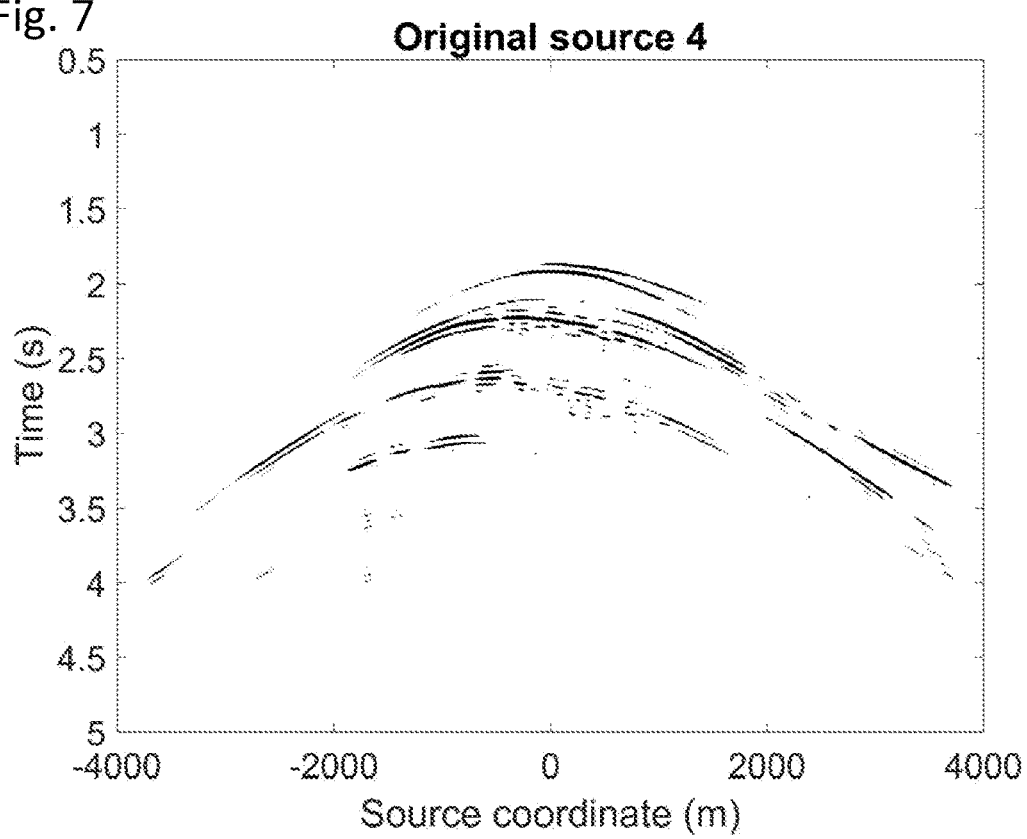
FIG. 7 shows a common-receiver gather from the simultaneous source complex salt data example with only source 4 firing as a reference solution.
Figure 8:
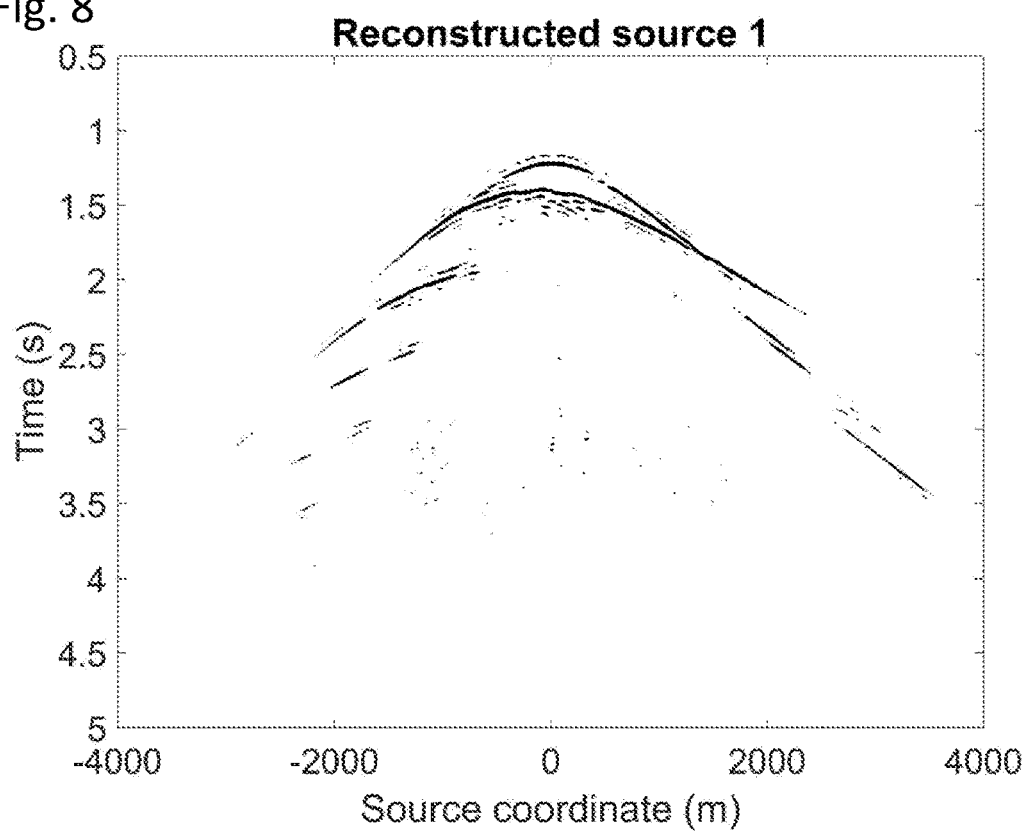
FIG. 8 shows a common-receiver gather from the simultaneous source complex salt data example with the separation result for source 1.
Figure 9:
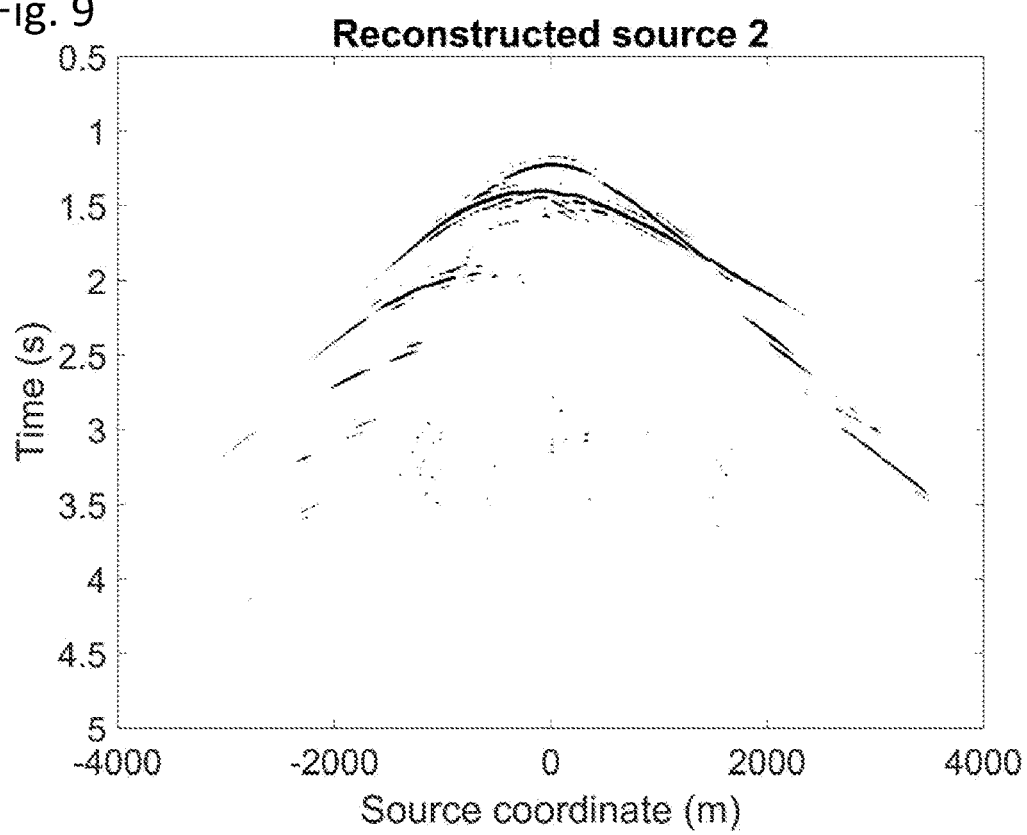
FIG. 9 shows a common-receiver gather from the simultaneous source complex salt data example with the separation result for source 2.
Figure 10:
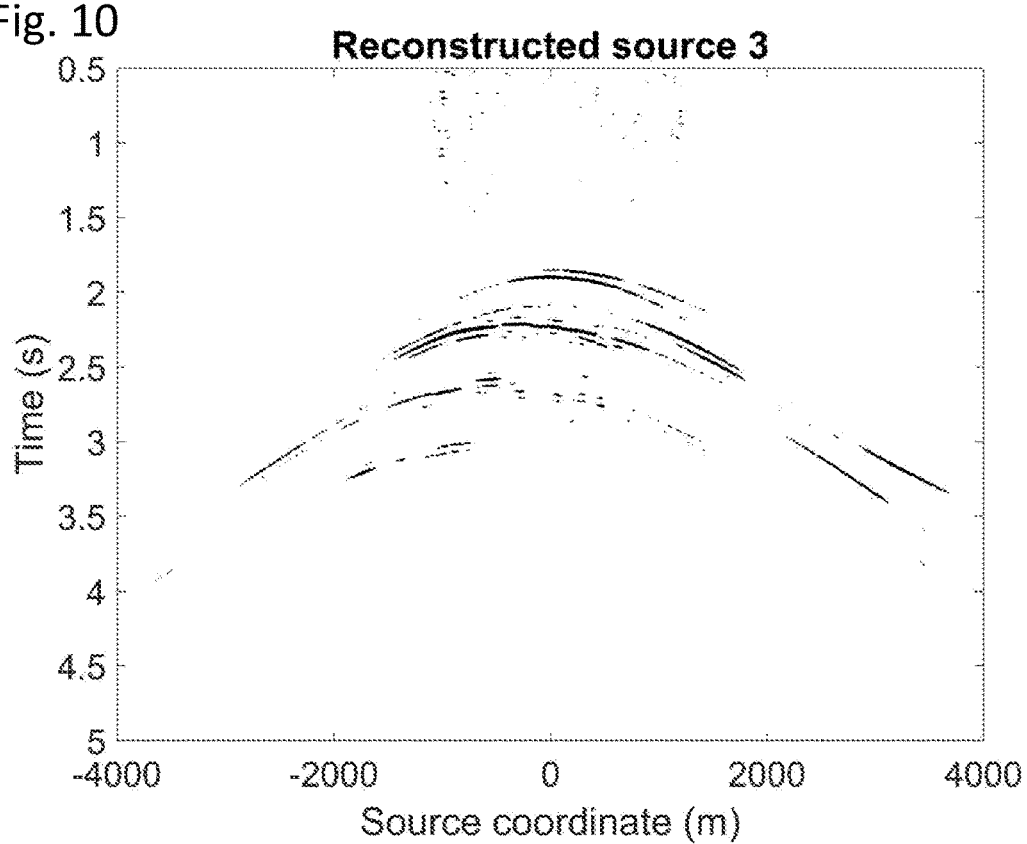
FIG. 10 shows a common-receiver gather from the simultaneous source complex salt data example with the separation result for source 3.
Figure 11:
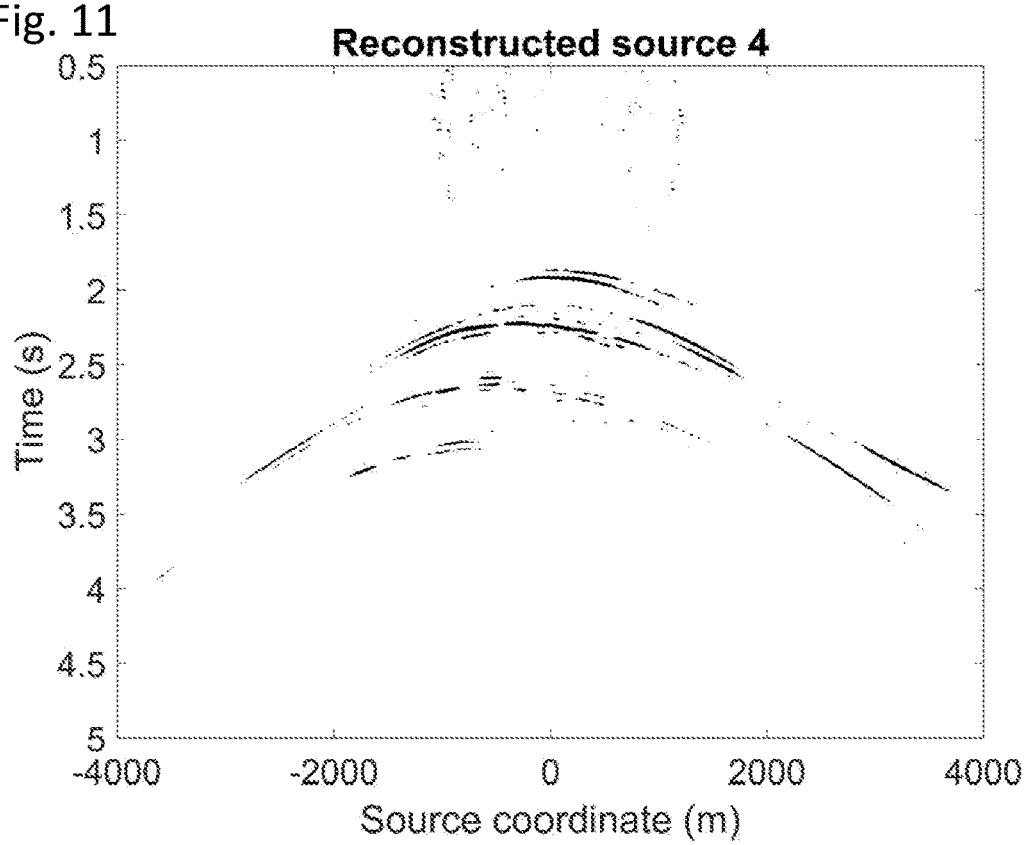
FIG. 11 shows a common-receiver gather from the simultaneous source complex salt data example with the separation result for source 4.
Figure 12:
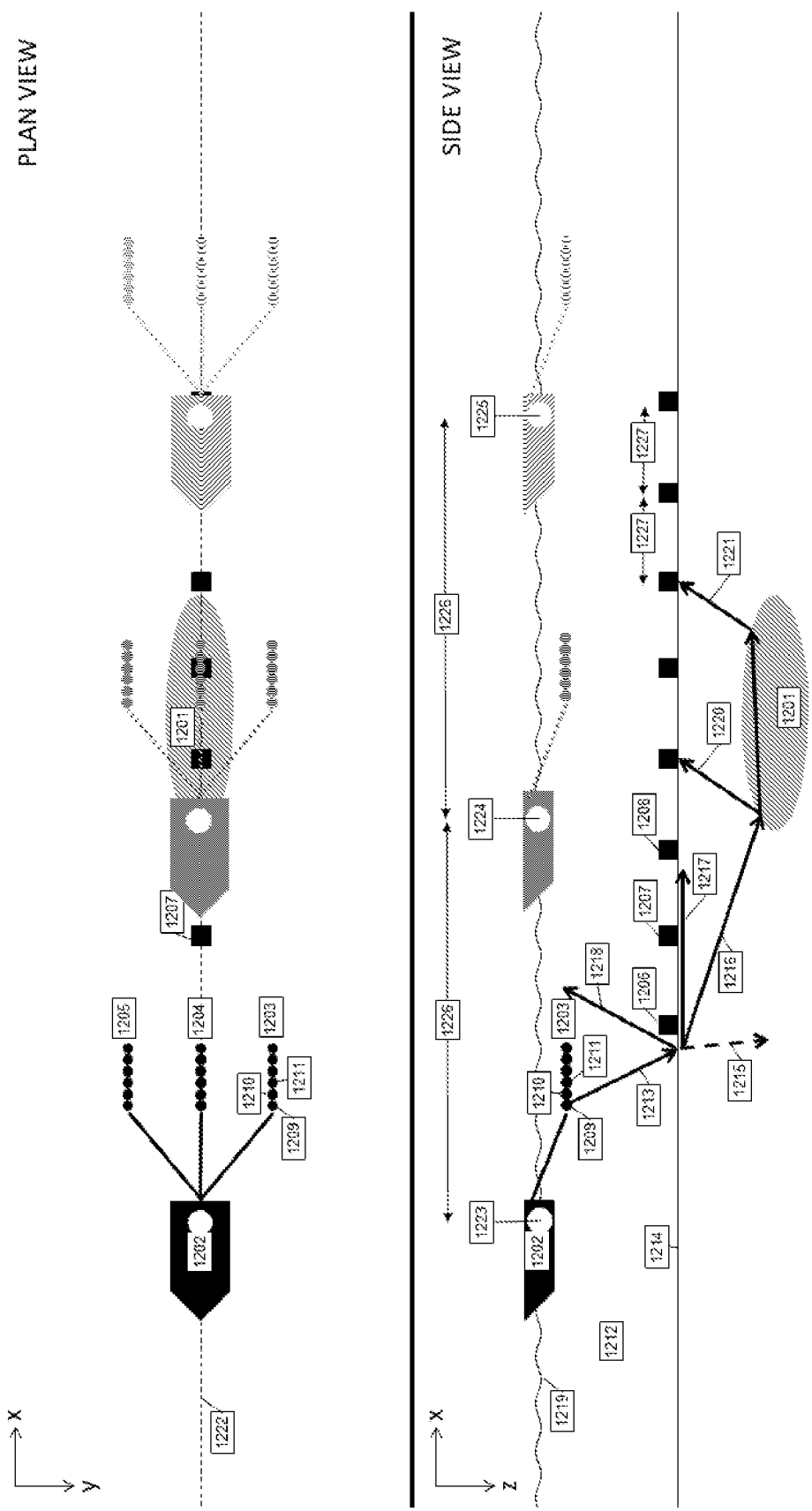
FIG. 12 illustrates the general practice of marine seismic surveying.
Figure 13:
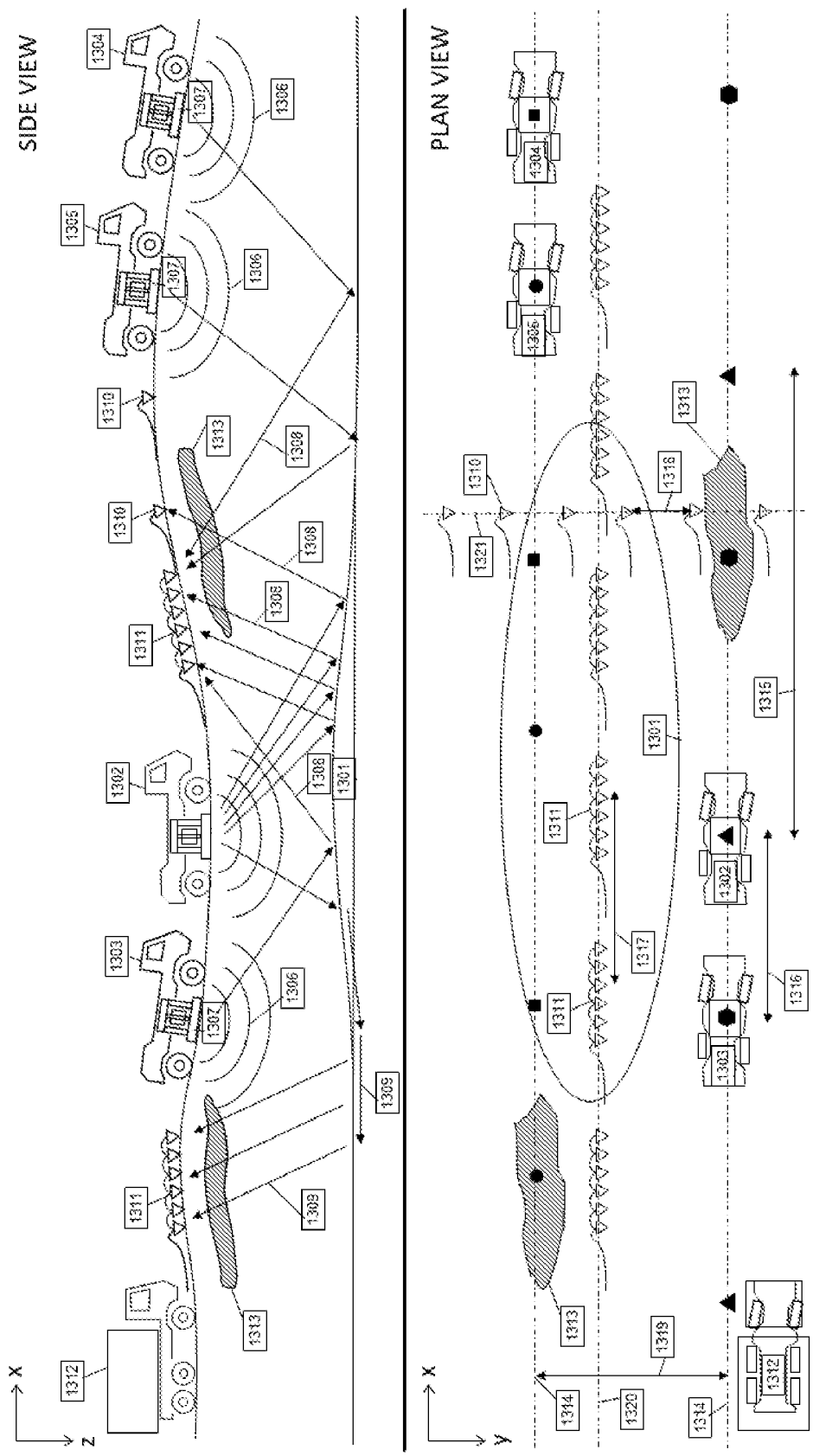
FIG. 13 illustrates the general practice of land seismic surveying.

FIG. 2 and FIG. 3 show the simultaneous source data with all four sources firing simultaneously. FIG. 4, FIG. 5, FIG. 6 and FIG. 7. show the reference solution for all sources hooting separately.

To separate the response between the two groups of sources (Vessel A and Vessel B) encoded using random dithers, we used alternating projections (POCS) between the two pairs with a Fourier apparition constraint on each pair (in 3d using time, source and receiver coordinates). After iterating the separation between the two groups of sources until we have reached a satisfactory result, we then separate the responses between each pair of sources (within each group) using the signal apparition routine.

FIG. 8, FIG. 9, FIG. 10 and FIG. 11. show the separated result for all sources shooting separately. These should be compared to FIG. 4, FIG. 5, FIG. 6 and FIG. 7. showing the reference solutions. A satisfactory separation result has been achieved for all four sources.

While various embodiments of the present disclosure have been described above, it should be understood that they have been presented by way of example only, and not of limitation.

Also note that while some of the methods and embodiments have been described and illustrated by way of two-dimensional theory, processing, data, and/or examples, they can be applied/apply equally to processing of three-dimensional data and, as can be appreciated by someone of ordinary skill in the art, can be generalised to operate with three-dimensional processing on three-dimensional data or even four- or five-dimensional processing by jointly considering simultaneous source data recorded at multiple receivers.

In addition, we note that it can be advantageous to process and separate local subsets of simultaneous source data acquired using the methods and principles described herein. Processing local subsets can reduce aliasing ambiguity and improve separation.

As should be clear to one possessing ordinary skill in the art, the methods described herein apply to different types of wavefield signals recorded (simultaneously or non-simultaneously) using different types of sensors, including but not limited to; pressure and/or one or more components of the particle motion vector (where the motion can be: displacement, velocity, or acceleration) associated with compressional waves propagating in acoustic media and/or shear waves in elastic media. When multiple types of wavefield signals are recorded simultaneously and are or can be assumed (or processed) to be substantially co-located, we speak of so-called "multi-component" measurements and we may refer to the measurements corresponding to each of the different types as a "component". Examples of multi-component measurements are the pressure and vertical component of particle velocity recorded by an ocean bottom cable or node-based seabed seismic sensor, the crossline and vertical component of particle acceleration recorded in a multi-sensor towed-marine seismic streamer, or the three component acceleration recorded by a microelectromechanical system (MEMS) sensor deployed e.g. in a land seismic survey.

The methods described herein can be applied to each of the measured components independently, or to two or more of the measured components jointly. Joint processing may involve processing vectorial or tensorial quantities representing or derived from the multi-component data and may be advantageous as additional features of the signals can be used in the separation. For example, it is well known in the art that particular combinations of types of measurements enable, by exploiting the physics of wave propagation, processing steps whereby e.g. the multi-component signal is separated into contributions propagating in different directions (e.g., wavefield separation), certain spurious reflected waves are eliminated (e.g., deghosting), or waves with a particular (non-linear) polarization are suppressed (e.g., polarization filtering). Thus, the methods described herein may be applied in conjunction with, simultaneously with, or after such processing of two or more of the multiple components.

Furthermore, in case the obtained wavefield signals consist of/comprise one or more components, then it is possible to derive local directional information from one or more of the components and to use this directional information in the reduction of aliasing effects in the separation as described herein in detail.

Further, it should be understood that the various features, aspects and functionality described in one or more of the individual embodiments are not limited in their applicability to the particular embodiment with which they are described, but instead can be applied, alone or in various combinations, to one or more of the other embodiments of the disclosure.

For example, it is understood that the techniques, methods and systems that are disclosed herein may be applied to all marine, seabed, borehole, land and transition zone seismic surveys, that includes planning, acquisition and processing. This includes for instance time-lapse seismic, permanent reservoir monitoring, VSP and reverse VSP, and instrumented borehole surveys (e.g. distributed acoustic sensing). Moreover, the techniques, methods and systems disclosed herein may also apply to non-seismic surveys that are based on wavefield data to obtain an image of the subsurface.

In FIG. 14, the relation between steps in the methods proposed herein is summarized. In a first step, seismic recordings are obtained using at least two methods, with at least one of the methods being based on signal apparition. This is done in accordance with the methods disclosed herein. In a second step, which is applied recursively, the wavefields encoded relative to each other in accordance with one of the at least two methods are decoded using the respective decoding method and the same step is applied to each of the results, while using each of the at least two methods only once. The recursion stops when each of the methods has been used. In a third step, sub-surface representations of structures or Earth media properties are generated using one or more of the mutually separated wavefields. Finally, in a fourth step, the generated sub-surface representations are output.

The methods described herein may be understood as a series of logical steps and (or grouped with) corresponding numerical calculations acting on suitable digital representations of the acquired seismic recordings, and hence can be implemented as computer programs or software comprising sequences of machine-readable instructions and compiled code, which, when executed on the computer produce the intended output in a suitable digital representation. More specifically, a computer program can comprise machine-readable instructions to perform the following tasks:

(1) Reading all or part of a suitable digital representation of the obtained wave field quantities into memory from a (local) storage medium (e.g., disk/tape), or from a (remote) network location;

(2) Repeatedly operating on the all or part of the digital representation of the obtained wave field quantities read into memory using a central processing unit (CPU), a (general purpose) graphical processing unit (GPU), or other suitable processor. As already mentioned, such operations may be of a logical nature or of an arithmetic (i.e., computational) nature. Typically the results of many intermediate operations are temporarily held in memory or, in case of memory intensive computations, stored on disk and used for subsequent operations; and (3) Outputting all or part of a suitable digital representation of the results produced when there no further instructions to execute by transferring the results from memory to a (local) storage medium (e.g., disk/tape) or a (remote) network location.

Computer programs may run with or without user interaction, which takes place using input and output devices such as keyboards or a mouse and display. Users can influence the program execution based on intermediate results shown on the display or by entering suitable values for parameters that are required for the program execution. For example, in one embodiment, the user could be prompted to enter information about e.g., the average inline shot point interval or source spacing. Alternatively, such information could be extracted or computed from metadata that are routinely stored with the seismic data, including for example data stored in the so-called headers of each seismic trace.

Next, a hardware description of a computer or computers used to perform the functionality of the above-described exemplary embodiments is described with reference to FIG. 15. In FIG. 15, the computer includes a CPU 1500 (an example of "processing circuitry") that performs the processes described above. The process data and instructions may be stored in memory 1502. These processes and instructions may also be stored on a storage medium disk such as a hard drive (HDD) or portable storage medium or may be stored remotely. Further, the claimed advancements are not limited to the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which computer communicates, such as a server or another computer.

Further, the claimed advancements may be provided as a utility application, background daemon, or component of an operating system, or combination thereof, executing in conjunction with CPU 1500 and an operating system such as Microsoft Windows 10, UNIX, Solaris, LINUX, Apple MAC-OS and other systems known to those skilled in the art.

The hardware elements in order to achieve the computer can be realized by various circuitry elements, known to those skilled in the art. For example, CPU 1500 can be a Xenon or Core processor from Intel of America or an Opteron processor from AMD of America, or may be other processor types that would be recognized by one of ordinary skill in the art.

Alternatively, the CPU 1500 can be implemented on an FPGA, ASIC, PLD or using discrete logic circuits, as one of ordinary skill in the art would recognize. Further, CPU 1500 may be implemented as multiple processors cooperatively working in parallel to perform the instructions of the inventive processes described above.

LIST OF CITED REFERENCES

[Abma et al., 2015] R. Abma, D. Howe, M. Foster, I. Ahmed, M. Tanis, Q. Zhang, A. Arogunmati and G. Alexander, Geophysics. 80, WD37 (2015).

[Akerberg et al., 2008] Akerberg, P., Hampson, G., Rickett, J., Martin, H., and Cole, J., 2008, Simultaneous source separation by sparse Radon transform: 78th Annual International Meeting, SEG, Expanded Abstracts, 2801-2805, doi:10.1190/1.3063927.

[Barnes, 1992] A. E. Barnes, GEOPHYSICS, 57(5), 749-751 (1992).

[Beasley et al., 1998] Beasley, C. J., Chambers, R. E., and Jiang, Z., 1998, A new look at simultaneous sources: 68th Annual International Meeting, SEG, Expanded Abstracts, 133-136.

[Bracewell, 1999] R. Bracewell, *The Fourier Transform & Its Applications* (McGraw-Hill Science, 1999).

[Halliday et al., 2014] Halliday and Laws, Seismic acquisition using phase-shifted sweeps: US Patent application US20140278119A1 (2014).

[Ikelle, 2010] L. T. Ikelle, *Coding and Decoding: Seismic Data: The Concept of Multishooting*. (Elsevier, 2010), Vol. 39.

[Kumar et al., 2015] R. Kumar, H. Wason and F. J. Herrmann, Geophysics. 80, WD73 (2015).

[Lynn et al., 1987] Lynn, W., Doyle, M., Larner, K., and Marschall, R., 1987, Experimental investigation of interference from other seismic crews: Geophysics, 52, 1501-1524.

[Moldoveanu et al., 2008] Moldoveanu, N., Kapoor, J., and Egan, M., 2008, Full-azimuth imaging using circular geometry acquisition: The Leading Edge, 27(7), 908-913. doi: 10.1190/1.2954032

[Mueller et al., 2015] M. B. Mueller, D. F. Halliday, D. J. van Manen and J. O. A. Robertsson, Geophysics. 80, V133 (2015).

[Robertsson et al., 2012] Robertsson, J. O. A., Halliday, D., van Manen, D. J., Vasconcelos, I., Laws, R., Özdemir, K., and Grønaas, H., 2012, Full-wavefield, towed-marine seismic acquisition and applications: 74th Conference and Exhibition, EAGE, Extended Abstracts.

[Robertsson et al., 2015] Robertsson, J. O. A., R. M. Laws, and J. E. Kragh, 2015, Marine seismic methods, in Resources in the near-surface Earth (eds. L. Slater and D. Bercovici), Treatise on Geophysics, $2^{nd}$ edition (ed. G. Schubert), Elsevier-Pergamon, Oxford.

[Robertsson et al., 2016] Robertsson, J. O. A., Amundsen, L., and Pedersen, Å. S., 2016, Express Letter: Signal apparition for simultaneous source wavefield separation: Geophys. J. Int., 206(2), 1301-1305: doi: 10.1093/gji/ggw210.

[Shipilova et al., 2016] Shipilova, E., Barone, I., Boelle, J. L., Giboli, M., Piazza, J. L., Hugonnet, P., and Dupinet, C., 2016, Simultaneous-source seismic acquisitions: do they allow reservoir characterization? A feasibility study with blended onshore real data: 86th Annual International Meeting, SEG, Expanded Abstracts.

[Stefani et al., 2007] Stefani, J., Hampson, G., and Herkenhoff, E. F., 2007, Acquisition using simultaneous sources: 69th Annual International Conference and Exhibition, EAGE, Extended Abstracts, B006.

[Stockwell, 1996] R. G. Stockwell, L. Mansinha, and R. P. Lowe. Signal Processing, IEEE Transactions on 44(4), 998-1001 (1996).

[Ziolkowski, 1987] Ziolkowski, A. M., 1987, The determination of the far-field signature of an interacting array of marine seismic sources from near-field measurements: Results from the Delft Air Gun experiment: First Break, 5, 15-29.

[van Manen et al., 2016a] van Manen, D. J., Andersson, F., Robertsson, J. O. A., and Eggenberger, K., 2016, Source separation method: GB Patent application No. 1603742.6 filed on 4 Mar. 2016.

[van Manen et al., 2016b] van Manen, D. J., Andersson, F., Robertsson, J. O. A., and Eggenberger, K., 2016, Simultaneous source acquisition and separation on general related sampling grids: GB Patent application No. 1608297.6 filed on 12 May 2016.

[van Manen et al., 2016c] D. J. van Manen, F. Andersson, J. O. A. Robertsson, K. Eggenberger, 2016, De-aliased source separation method: GB patent application No. 1605161.7 filed on 4 Mar. 2016.

The invention claimed is:

1. A method for simultaneous source acquisition and/or separation, comprising:
    obtaining seismic recordings using at least two different simultaneous source acquisition and/or separation methods, wherein at least one of the simultaneous source acquisition and/or separation methods includes performing a signal apparition process;
    separating, using the seismic recordings, wavefields encoded relative to each other in accordance with at least one of the at least two different simultaneous source acquisition and/or separation methods;
    generating a sub-surface representation of structures or Earth media properties from at least one of the separated wavefields; and
    outputting the generated sub-surface representation.

2. The method of claim 1, wherein at least one of the simultaneous source acquisition and/or separation methods is not based on signal apparition, but is based on space-encoded simultaneous source acquisition and/or separation.

3. The method of claim 2, wherein at least one of the simultaneous source acquisition and/or separation methods is not based on signal apparition, but utilizes random-dithered source acquisition and/or separation.

4. The method of claim 1; wherein at least one of the simultaneous source acquisition methods is not based on signal apparition; but is based on time-encoded simultaneous source acquisition and/or separation.

5. The method of claim 1, wherein the at least one of the simultaneous source acquisition methods is not based on signal apparition, but utilizes random encoding or orthogonal sequence encoding.

6. The method of claim 1, further comprising acquiring the seismic recordings using at least two groups of seismic sources, wherein at least one group of the at least two groups contains at least two sources.

7. The method of claim 6, wherein the at least two sources within the at least one group are encoded using signal apparition.

8. The method of claim 6, wherein the seismic sources within the at least two groups are encoded using signal apparition, and signals of the at least two groups are mutually separated using a separation method not based on seismic apparition.

9. The method of claim 6, wherein the step of acquiring seismic recordings comprises acquiring marine seismic recordings, and the seismic sources within each group of the at least two groups are towed by a same vessel.

10. The method of claim 6, wherein the step of acquiring seismic recordings comprises acquiring marine seismic recordings, and each group of the at least two groups of seismic sources is towed by a different vessel.

11. The method of claim 6, wherein the step of acquiring seismic recordings comprises acquiring land seismic recordings, and the seismic sources within each group of the at least two groups belong to a same vibroseis source array.

12. The method of claim 6, wherein the step of acquiring seismic recordings comprises acquiring land seismic recordings, and each group of the at least two groups of seismic sources belongs to a different vibroseis source array.

13. The method of claim 12, wherein the step of acquiring seismic recordings comprises acquiring point-source seismic recordings.

14. The method of claim 13, further comprising compensating for static shifts and perturbations after performing simultaneous source separation using signal apparition.

15. The method of claim 1, wherein the signal apparition process comprises:
    obtaining the seismic recordings based on activation of at least two sources along one or more activation lines by varying at least one parameter between the at least two sources from one activation to a following, the at least one parameter being at least one of source signal amplitude, source signal spectrum, source activation time, source location at activation time, and source depth, such that the varying generates one or more scaled replications of a first wavefield with effective numerical support in a frequency-wavenumber domain of at least one of the at least two sources along a wavenumber axis or axes with the one or more scaled replications partially overlapping a second wavefield with effective numerical support of one or more of other sources of the at least two sources with the first wavefield with effective numerical support, the one or more of the other sources of the at least two sources being not affected or also replicated and scaled by the varying; and
    separating a contribution of the at least one of the at least two sources to the obtained wavefield recordings as generated by the at least two sources individually in absence of the one or more of the other sources of the at least two sources.

16. The method of claim 1, wherein the obtained seismic recordings comprise multiple components.

17. The method of claim 1, wherein the step of acquiring seismic recordings comprises acquiring land seismic recordings, marine seismic recordings, seabed seismic recordings, permanent monitoring seismic recordings, time-lapse seismic recordings, transition zone seismic recordings, or borehole seismic recordings.

18. The method of claim 1, wherein the separating step comprises recursively separating the wavefields encoded relative to each other using a corresponding decoding method, while using each of the at least two different methods only once.

* * * * *